United States Patent
Yun

(10) Patent No.: US 9,894,402 B2
(45) Date of Patent: Feb. 13, 2018

(54) MULTIMEDIA DEVICE AND METHOD FOR CONTROLLING THE SAME

(71) Applicant: LG ELECTRONICS INC., Seoul (KR)

(72) Inventor: Jaesun Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 14/955,903

(22) Filed: Dec. 1, 2015

(65) Prior Publication Data

US 2016/0156957 A1    Jun. 2, 2016

(30) Foreign Application Priority Data

Dec. 2, 2014    (KR) .................. 10-2014-0170412

(51) Int. Cl.
   *G06F 3/0481*    (2013.01)
   *G06F 3/0482*    (2013.01)
   (Continued)

(52) U.S. Cl.
   CPC ....... *H04N 21/4312* (2013.01); *G06F 3/0482* (2013.01); *G06F 3/04817* (2013.01);
   (Continued)

(58) Field of Classification Search
   CPC ....... H04N 21/44204; H04N 21/44222; H04N 5/44543; H04N 21/4438; H04N 7/141;
   (Continued)

(56) References Cited

U.S. PATENT DOCUMENTS

| 9,582,157 B1* | 2/2017 | Chatterjee ........... G06F 17/3084 |
| 2005/0160458 A1* | 7/2005 | Baumgartner ......... H04H 60/46 725/46 |

(Continued)

FOREIGN PATENT DOCUMENTS

| EP | 2461577 A1 | 6/2012 |
| GB | 2443959 A | 5/2008 |

*Primary Examiner* — Hai V Tran
(74) *Attorney, Agent, or Firm* — Birch, Stewart, Kolasch & Birch, LLP

(57) ABSTRACT

A disclosure is disclosed a multimedia device and a method thereof. According to an embodiment of the present invention, a multimedia device of providing a menu bar providing at least one of an available channel, an available application or an available content which is accessible thereof, the multimedia device comprises a display for displaying video data, and a controller for controlling the menu bar to display on the displayed video data in response to a first signal from a remote controller, wherein the menu bar includes a first icon and a second icon, wherein the first icon is related to at least one of a preferred channel, a channel viewed over a predetermined time, a channel viewed over a predetermined number, a recommended content, a recommended application or a recommended channel, wherein the second icon corresponds to a specific user, and wherein, when the second icon is selected, the controller further controls the display to display a Graphic User Interface (GUI) related to a function among a plurality of functions of the multimedia device based on history data of the specific user using the multimedia device.

19 Claims, 26 Drawing Sheets

(51) Int. Cl.
| | |
|---|---|
| *H04N 21/431* | (2011.01) |
| *H04N 21/442* | (2011.01) |
| *H04N 21/4722* | (2011.01) |
| *H04N 21/482* | (2011.01) |
| *H04N 21/475* | (2011.01) |
| *H04N 21/44* | (2011.01) |
| *H04N 21/4415* | (2011.01) |
| *H04N 21/45* | (2011.01) |

(52) U.S. Cl.
CPC ... *H04N 21/44008* (2013.01); *H04N 21/4415* (2013.01); *H04N 21/44204* (2013.01); *H04N 21/44222* (2013.01); *H04N 21/4532* (2013.01); *H04N 21/4722* (2013.01); *H04N 21/4753* (2013.01); *H04N 21/482* (2013.01); *H04N 21/4826* (2013.01)

(58) Field of Classification Search
CPC ....... H04N 2005/441; H04N 21/25875; H04N 21/4312; H04N 21/482; H04N 5/4403; H04N 21/4532; H04N 21/4821; H04N 21/4826; G06F 3/04817; G06F 3/0484; G06F 3/0486
See application file for complete search history.

(56) References Cited

U.S. PATENT DOCUMENTS

| | | | |
|---|---|---|---|
| 2008/0062137 | A1 | 3/2008 | Brodersen et al. |
| 2008/0092045 | A1 | 4/2008 | Candelore |
| 2009/0204929 | A1* | 8/2009 | Baurmann ......... H04N 5/44543 715/836 |
| 2009/0222757 | A1* | 9/2009 | Gupta ................ H04N 5/44543 715/776 |
| 2011/0314386 | A1* | 12/2011 | Jeong .................... G06F 3/0487 715/741 |
| 2012/0060092 | A1 | 3/2012 | Hill et al. |
| 2012/0311635 | A1 | 12/2012 | Mushkatblat |
| 2013/0326583 | A1* | 12/2013 | Freihold ............. G06F 3/04815 726/3 |
| 2014/0293130 | A1 | 10/2014 | Yabu |
| 2015/0067531 | A1* | 3/2015 | Adimatyam ......... G06F 3/0481 715/745 |

\* cited by examiner

FIG. 15
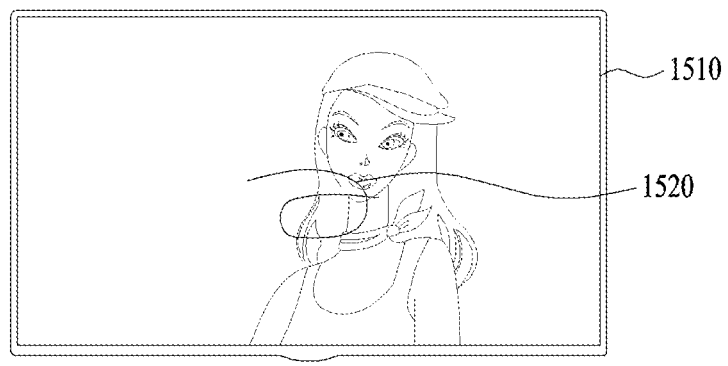
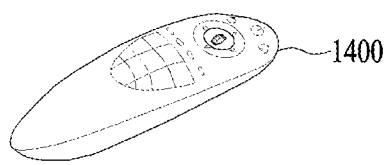
FIG. 16
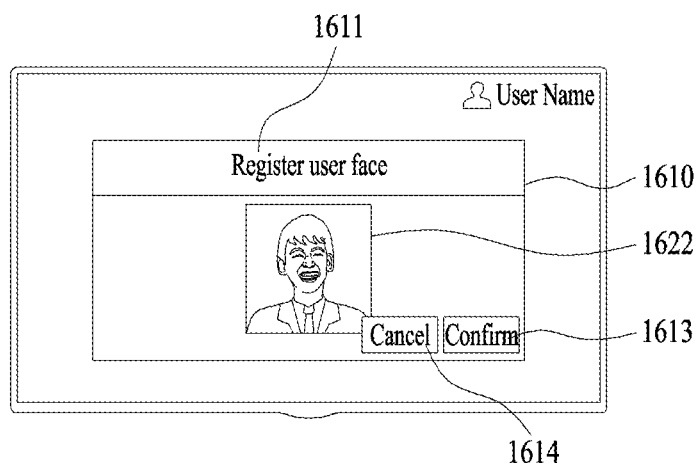

FIG. 17
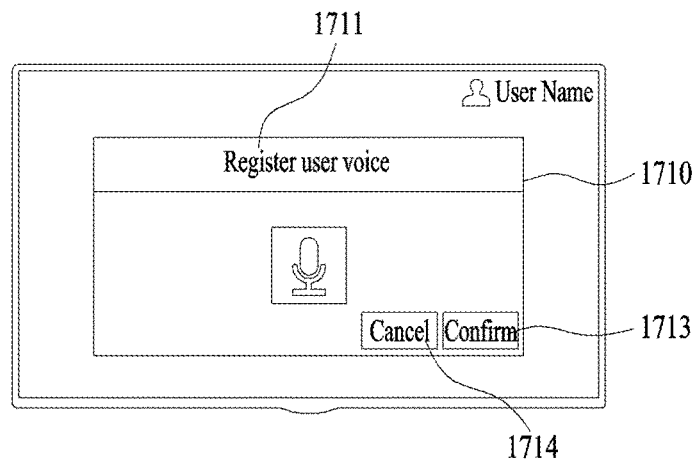
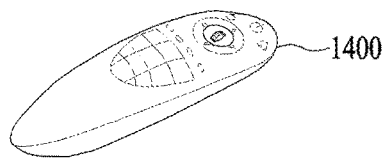
FIG. 18
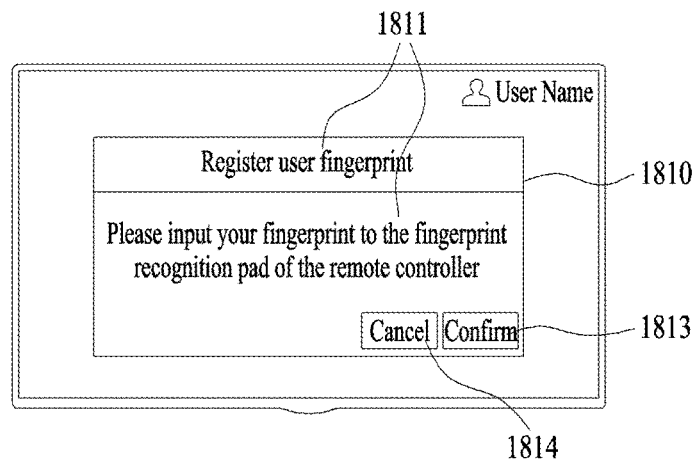
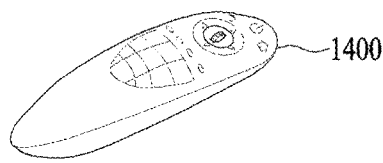

FIG. 33
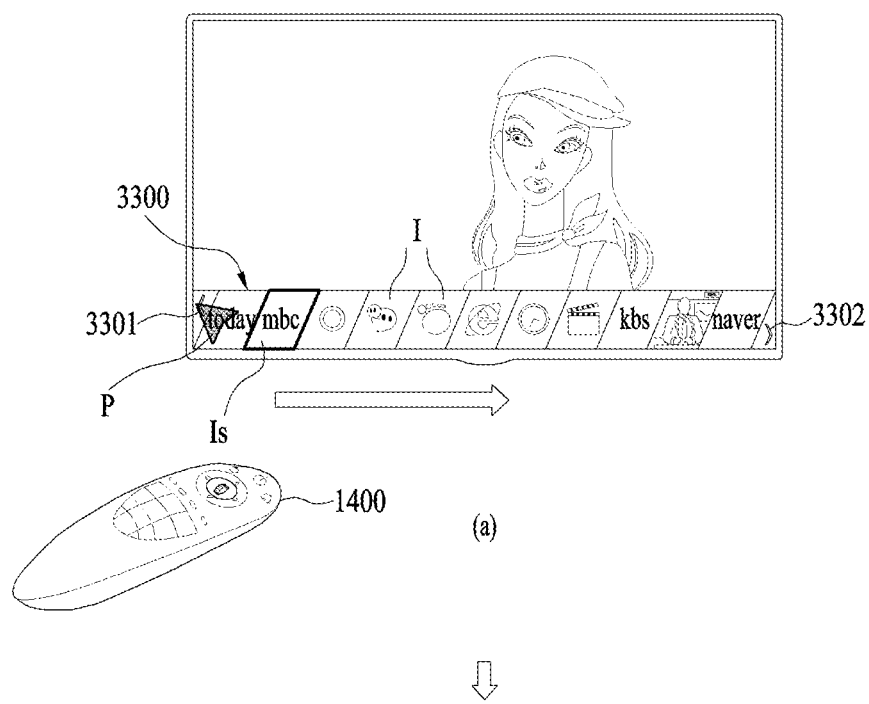
(a)
⇩
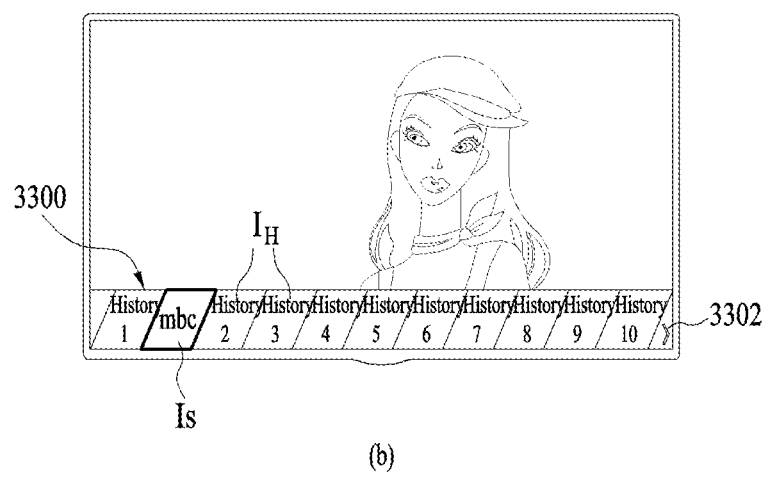
(b)

FIG. 34
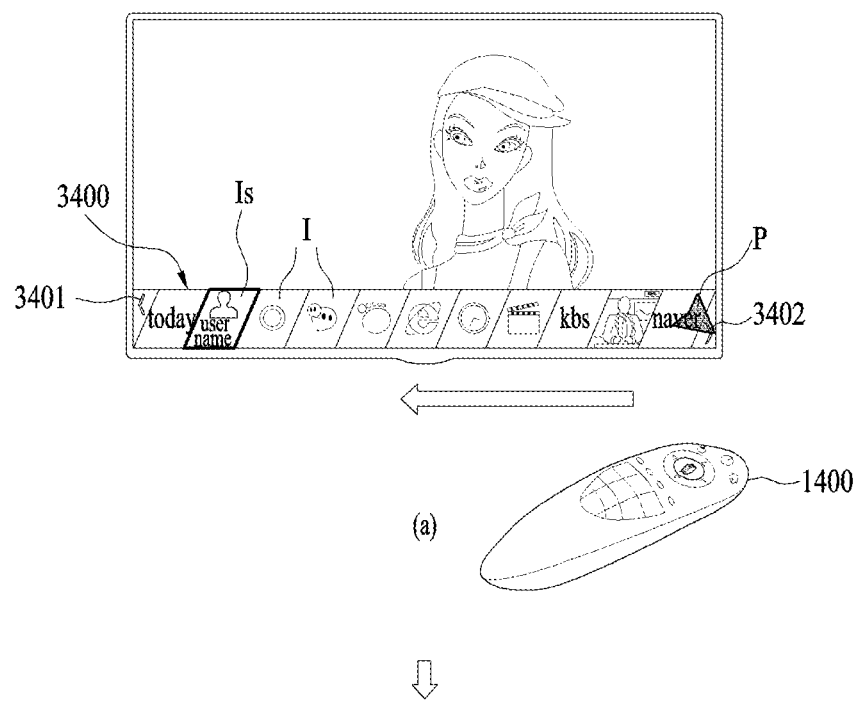
(a)
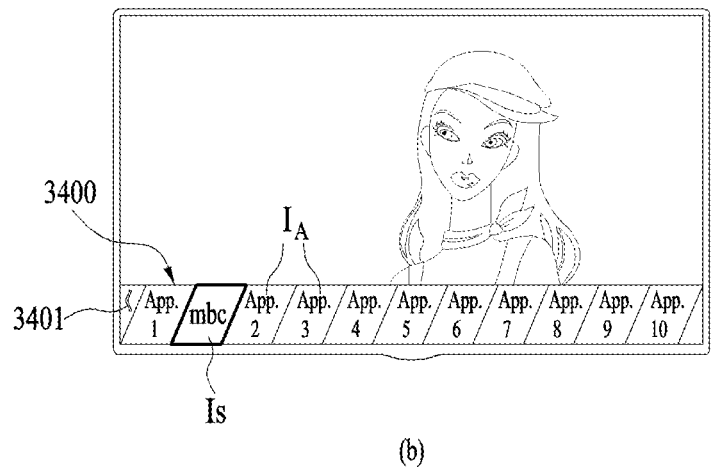
(b)

MULTIMEDIA DEVICE AND METHOD FOR CONTROLLING THE SAME

Pursuant to 35 U.S.C. § 119(a), this application claims the benefit of Korean Patent Application No. 10-2014-0170412, filed on Dec. 2, 2014, which is hereby incorporated by reference as if fully set forth herein.

BACKGROUND OF THE INVENTION

Field of the Invention

The present invention relates to a multimedia device and a method for controlling the same.

Discussion of the Related Art

Not only various standing devices (e.g., a Personal Computer (PC), a television (TV), etc.) but also various mobile devices (e.g., a smartphone, a tablet PC, etc.) have been remarkably developed and come into widespread use. Although the standing devices and the mobile devices have been developed in different ways in their unique regions, their unique regions become ambiguous according to the boom of digital convergence.

Meanwhile, not only a broadcast reception function but also various additional functions (e.g., a computer support function, an Internet function, etc.) have been added to TVs, such that the latest TVs have been implemented as multimedia devices including complex or hybrid functions. However, a method for providing a user environment to each user of the above-mentioned multimedia device in such a manner that each user can more easily access various functions using the user environment needs to be discussed in future.

SUMMARY OF THE INVENTION

Accordingly, the present invention is directed to a multimedia device and a method for controlling the same that substantially obviates one or more problems due to limitations and disadvantages of the related art.

An object of the present invention is to provide a method for obviating the above-mentioned problems and other problems. Another object of the present invention is to provide a multimedia device configured to easily log in with a specific user account, and a method for controlling the same.

Another object of the present invention is to provide a multimedia device for providing a user environment in a manner that a user can easily access functions of the multimedia device, and a method for controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multimedia device of providing a menu bar providing at least one of an available channel, an available application or an available content which is accessible thereof, the multimedia device comprises a display for displaying video data, and a controller for controlling the menu bar to display on the displayed video data in response to a first signal from a remote controller, wherein the menu bar includes a first icon and a second icon, wherein the first icon is related to at least one of a preferred channel, a channel viewed over a predetermined time, a channel viewed over a predetermined number, a recommended content, a recommended application or a recommended channel, wherein the second icon corresponds to a specific user, and wherein, when the second icon is selected, the controller further controls the display to display a Graphic User Interface (GUI) related to a function among a plurality of functions of the multimedia device based on history data of the specific user using the multimedia device.

A method of controlling a multimedia device to provide a menu bar which is capable of accessing at least one of an available channel, an available application or an available content, the method comprises logging-in the multimedia based on an account of a specific user, displaying the menu bar corresponding to the account of the logged-in user, monitoring at least one of history data of an available channel and an available program on the multimedia device, an execution history of an available application on the multimedia device, or an execution history of an available content on the multimedia device after logged-in, and changing a configuration of the displayed menu bar based on a result of the monitoring.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15 is a conceptual diagram illustrating a login method using a specific user account for use in a multimedia device according to an embodiment of the present invention.

FIG. 16 is a conceptual diagram illustrating another method for storing information regarding a specific user in a memory of the multimedia device according to an embodiment of the present invention.

FIG. 17 is a conceptual diagram illustrating another method for storing information regarding a specific user in a memory of the multimedia device according to an embodiment of the present invention.

FIG. 18 is a conceptual diagram illustrating another method for storing information regarding a specific user in a memory of the multimedia device according to an embodiment of the present invention.

FIG. 33 is a conceptual diagram illustrating one exemplary method for scrolling icons contained in the menu bar of the multimedia device, or outputting another page constructing the menu bar to the display unit according to an embodiment of the present invention.

FIG. 34 is a conceptual diagram illustrating another exemplary method for scrolling icons contained in the menu bar of the multimedia device, or outputting another page constructing the menu bar to the display unit according to an embodiment of the present invention.

DESCRIPTION OF SPECIFIC EMBODIMENTS

Figure 1:
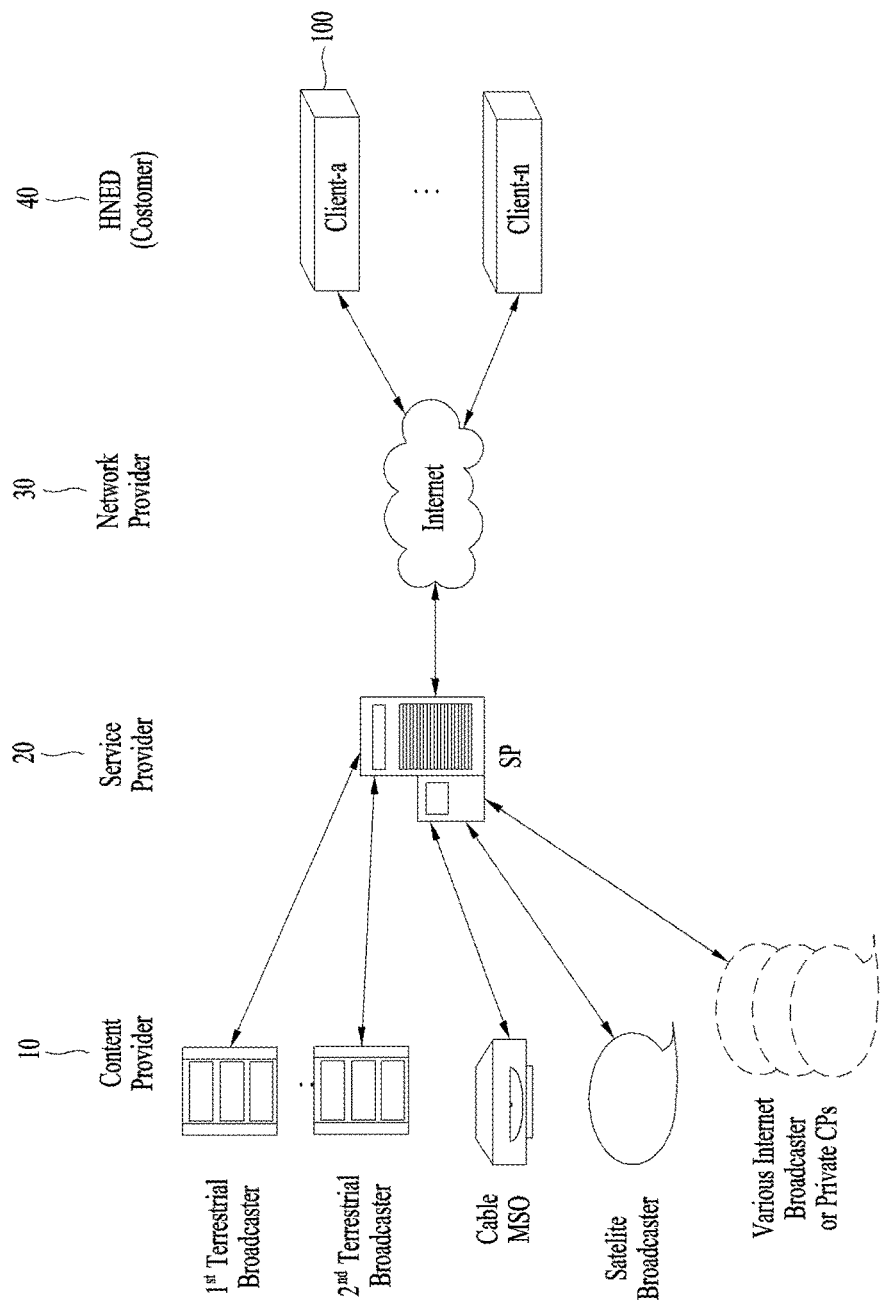
FIG. 1 is a schematic diagram illustrating a service system including a digital device according to one embodiment of the present invention.

Description will now be given in detail according to exemplary embodiments disclosed herein, with reference to the accompanying drawings. For the sake of brief description with reference to the drawings, the same or equivalent components can be provided with the same reference numbers, and description thereof will not be repeated.

In general, a suffix such as "module" and "unit" can be used to refer to elements or components. Use of such a suffix herein is merely intended to facilitate description of the specification, and the suffix itself is not intended to give any special meaning or function. Meanwhile, such an ordinal number as 'first-', 'second', 'third' and the like can have a meaning of an order. Yet, the terminologies can be used for the purpose of distinguishing one component from another component capable of being overlapped with each other. In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings.

As such, the present disclosure should be construed to extend to any alterations, equivalents and substitutes in addition to those which are particularly set out in the accompanying drawings.

A digital device according to the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive the prescribed data. Examples of the digital device can include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIG. 2 and mobile device is used in FIG. 3 depicting the digital device. Further, the digital device in this specification can be referred to configuration having only a panel, set-top box (STB), or a set including the entire system.

Moreover, the wired or wireless network described in this specification can refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device.

Meanwhile, the digital device can perform intelligent functions such as receiving broadcasting program, operating computer functions, and supporting at least one external input, and by being connected through the network wired or wirelessly, the digital device can support e-mail functions, web browsing functions, banking, gaming, and executing applications. The digital device can further include an interface for any one of input or control means (hereinafter referred as "input means") supporting handwriting input, touch-screen, and space remote control.

Furthermore, the digital device can use standard operating system (OS), however, the digital device described in this specification and the embodiments, uses Web OS. Therefore, the digital device can perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input means or digital devices, capable of transmitting and receiving data through wired or wireless network connected to and from the digital device. For example, the external input includes High Definition Multimedia Interface (HDMI), game devices such as playstation or X-Box, smart phone, tablet PC, printing device such as pocket photo, digital devices such as smart TV and blue-ray device.

The "server" referred to as in this application, includes digital device or system capable of transmitting and receiving data to and from client, and can also be referred to as a processor. For example, the server can be servers providing services such as portal server providing web page, web content or web service, advertising server providing advertising data, content server, Social Network Service (SNS) server providing SNS service, service server providing service to manufacturer, Multichannel Video Programming Distributor (MVPD) providing Video on Demand or streaming service, and service server providing pay services.

In this application, when application is described for the convenience of explanation, the meaning of application in the context can include services as well as applications.

In the following description, various embodiments according to the present invention are explained with reference to attached drawings.

FIG. 1 illustrates a broadcast system including a digital receiver according to an embodiment of the present invention.

Referring to FIG. 1, examples of a broadcast system comprising a digital receiver can include a content provider (CP) 10, a service provider (SP) 20, a network provider (NP) 30, and a home network end user (HNED) (Customer) 40. The HNED 40 includes a client 100, that is, a digital receiver.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Each of the CP 10, SP 20 and NP 30, or a combination thereof can be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

According to the present invention, a digital device can include a manager to manage a display window of the digital device and to generate and to transmit a plurality of status data of the digital device to a controller and the controller to receive a first signal from a first application requesting registration as an application voter, to transmit a second signal requesting a confirmation related to execute a second application to the first application when first status data is received from a service interface, to receive a response to the second signal from the first application, and to execute the second application to enter a screensaver mode based on the received response.

Figure 2:
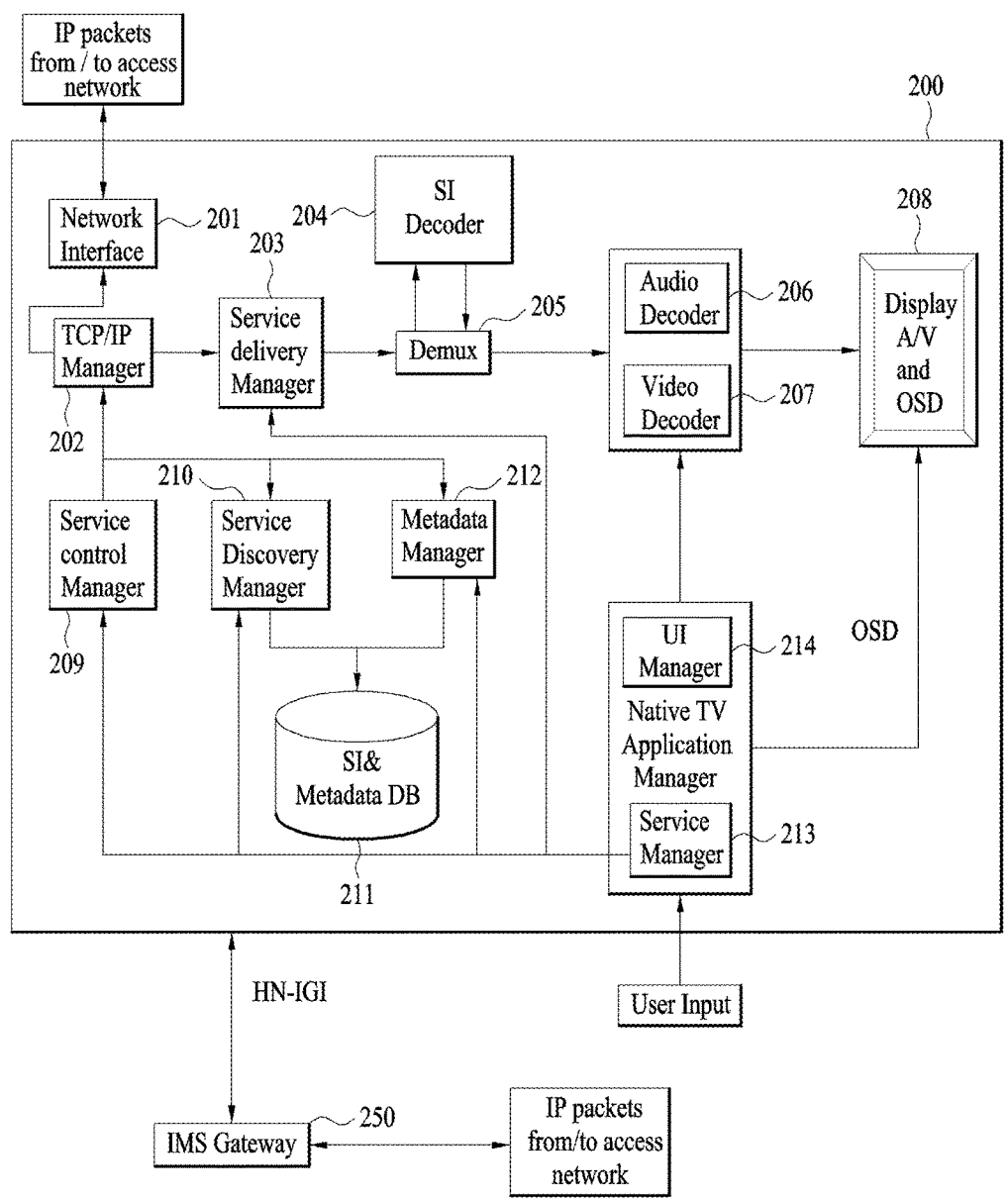
FIG. 2 is a block diagram showing a digital device according to one embodiment of the present invention.
Figure 3:
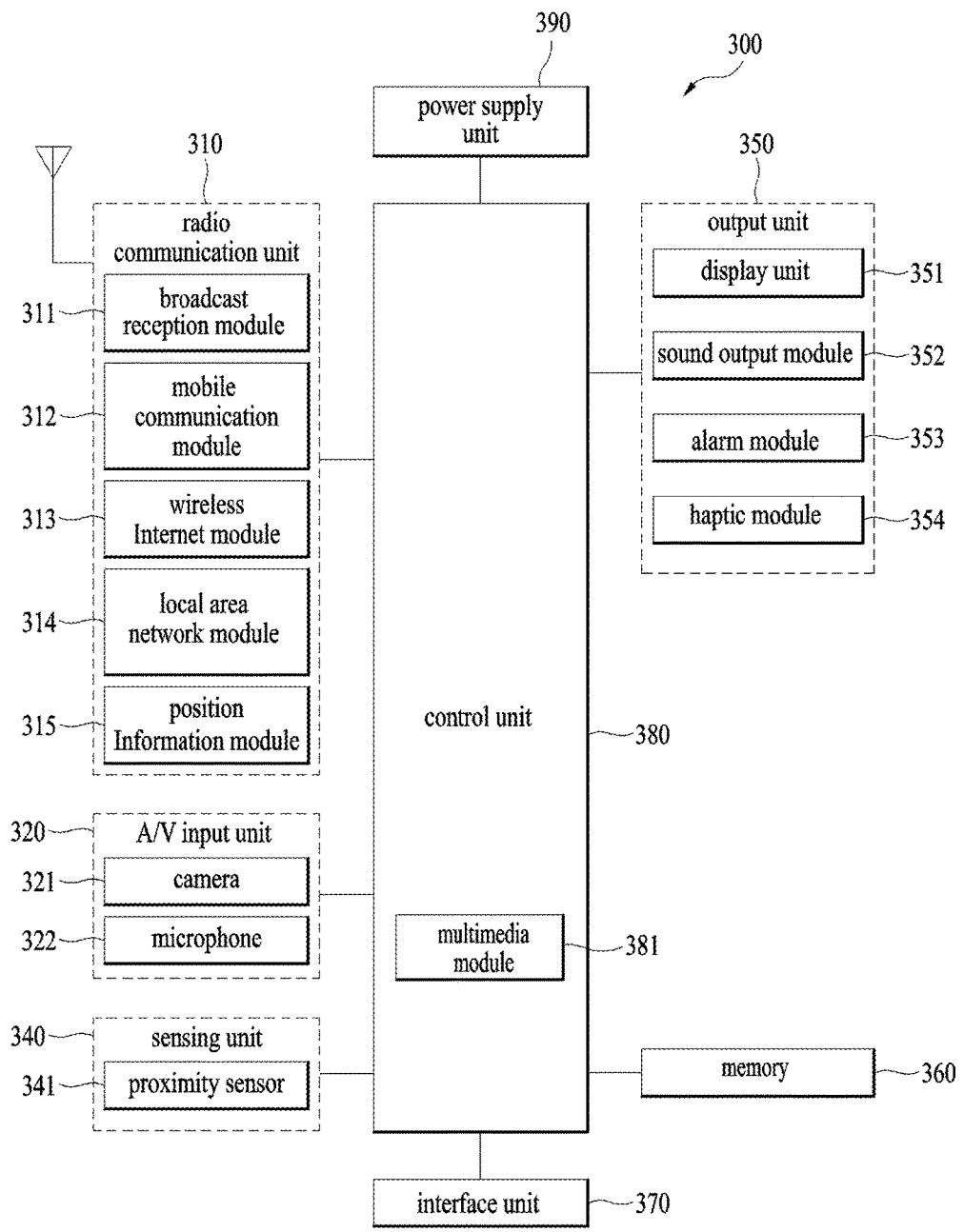
FIG. 3 is a block diagram showing the configuration of a digital device according to another embodiment of the present invention.

FIG. 2 is a schematic diagram of a digital receiver 200 according to an embodiment of the present invention. The digital receiver 200 can correspond to the client 100 shown in FIG. 1.

The digital receiver 200 can include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 can receive or transmit IP packets including service data through a network. In other words, the network interface 201 can receive IP packets including at least one of text data, image data, audio data, and video data, used for SNS, as well as services and applications from a server connected thereto through a network.

The TCP/IP manager 202 can involve delivery of IP packets transmitted to the digital receiver 200 and IP packets transmitted from the digital receiver 200, that is, packet delivery between a source and a destination. The TCP/IP manager 202 can classify received packets according to an appropriate protocol and output the classified packets to the service delivery manager 205, the service discovery manager 210, the service control manager 209, and the metadata manager 212.

The service delivery manager 203 can control classification and processing of service data. The service delivery manager 203 can control real-time streaming data, for example, using real-time protocol/real-time control protocol (RTP/RTCP). In other words, the service delivery manager 203 can parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 can demultiplex audio data, video data, SI from a received packet through packet identifier (PID) filtering and transmit the demultiplexed data to corresponding processors, that is, the audio/video decoder 206/207 and the SI decoder 204.

The SI decoder 204 can parse and/or decode SI data such as program specific information (PSI), program and system information protocol (PSIP), digital video broadcast-service information (DVB-SI), etc. The SI decoder 204 can store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively can decode audio data and video data, which are demultiplexed by the demultiplexer 205. The decoded audio data and video data can be provided to the user through the display unit 208.

The application manager can include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD.

The service manager 213 can control and manage service-related managers such as the service delivery manager 203, the service discovery manager 210, the service control manager 209, and the metadata manager 212.

The service manager 213 can configure a channel map and enable channel control at the request of the user on the basis of the channel map. The service manager 213 can receive service information corresponding to channel from the SI decoder 204 and set audio/video PID of a selected channel to the demultiplexer 205 so as to control the demultiplexing procedure of the demultiplexer 205.

The service discovery manager 210 can provide information required to select a service provider that provides a service. Upon receipt of a signal for selecting a channel from the service manager 213, the service discovery manager 210 discovers a service on the basis of the received signal.

The service control manager 209 can select and control a service. For example, the service control manager 209 can perform service selection and control using IGMP (Internet Group Management Protocol) or real time streaming protocol (RTSP) when the user selects a live broadcast service and using RTSP when the user selects a video on demand (VOD) service. The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 can manage metadata regarding services and store metadata in the SI & metadata DB 211.

The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data.

The SI & metadata DB 211 can be implemented using a Non-Volatile RAM (NVRAM) or a Flash memory, and the like.

An IMS (IP Multimedia Subsystem) gateway 250 can include functions required to access an IMS based IPTV services.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components can be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel can include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal can be implemented as a TV broadcast signal, a radio broadcast signal, and/or a data broadcast signal, among other signals. If desired, the broadcast signal can further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information can include an electronic program guide (EPG) of digital multimedia broadcasting (DMB) and an electronic service guide (ESG) of digital video broadcast-handheld (DVB-H).

The broadcast receiving module 311 can be configured to receive broadcast signals transmitted from various types of broadcast systems. By non-limiting example, such broadcasting systems can include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 can be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals can carry audio, video, and data according to text/multimedia messages.

The wireless Internet module 313 supports Internet access for the mobile terminal 300. This module can be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 can be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™ to name a few.

The position-location module 315 identifies or otherwise obtains the location of the mobile terminal 100. According to one embodiment, this module can be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 can detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 can sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 can additionally or alternatively display images which are associated with these modes, the UI or the GUI.

The display module 351 can be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 can include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen can be named 'proximity touch' and an action of enabling the pointer to actually come into contact with the touch screen can named 'contact touch'. And, a position, at which the proximity touch is made to the touch screen using the pointer, can mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 can be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 can generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 can be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 can be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 can be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 can include a multimedia module 381 that provides multimedia playback. The multimedia module 381 can be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power can be internal power, external power, or combinations of internal and external power.

Various embodiments described herein can be implemented in a computer-readable medium using, for example, computer software, hardware, or some combination of computer software and hardware. For a hardware implementation, the embodiments described herein can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments can also be implemented by the controller 180.

For a software implementation, the embodiments described herein can be implemented with separate software modules, such as procedures and functions, each of which performs one or more of the functions and operations described herein. The software codes can be implemented with a software application written in any suitable programming language and can be stored in memory such as the memory 160, and executed by a controller or processor, such as the controller 380.

Figure 4:
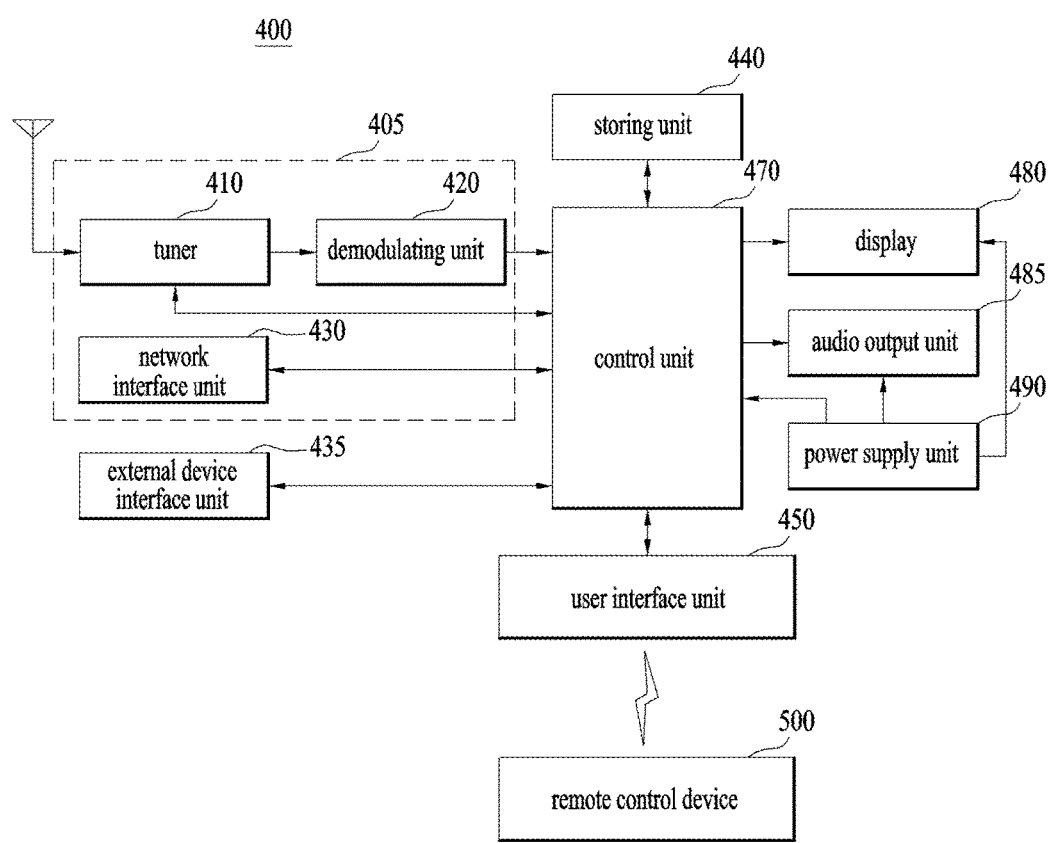
FIG. 4 is a diagram showing a digital device according to another embodiment of the present invention.

FIG. 4 illustrates a digital receiver according to another embodiment of the present invention.

Referring to FIG. 4, an exemplary digital receiver 400 according to the present invention can include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 can include at least one of one or more tuner 410, a demodulator 420, and a network interface 430.

The broadcast receiving unit 405 can include the tuner 410 and the demodulator 420 without the network interface 430, or can include the network interface 430 without the tuner 410 and the demodulator 420. The broadcast receiving unit 405 can include a multiplexer (not shown) to multiplex a signal, which is subjected to the tuner 410 and demodulated by the demodulator 420, and a signal received through the network interface 40.

In addition, the broadcast receiving unit 405 can include a demultiplexer (not shown) and demultiplex a multiplexed signal, a demodulated signal, or a signal received through the network interface 430.

The tuner 410 can receive a radio frequency (RF) broadcast signal by tuning to a channel selected by the user from among RF broadcast signals received through an antenna or all previously stored channels.

The demodulator 420 can receive a digital IF (Intermediate Frequency) signal (DIF) converted by the tuner 410 and demodulate the DIF signal.

A stream signal output from the demodulator 420 can be input to the controller 470.

The controller 470 can control demultiplexing, audio/video signal processing, etc. Furthermore, the controller 470 can control output of an image through the display unit 480 and output of audio through the audio output unit 485.

The external device interface 435 can provide an environment for interfacing external devices with the digital receiver 400. To implement this, the external device interface 435 can include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit can include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 can provide an interface for connecting the digital receiver 400 to wired/wireless networks.

Using the network interface 430, the digital receiver can transmit/receive data to/from other users or other electronic apparatuses or access a predetermined web page through a network connected thereto or another network linked to the connected network.

The network interface 430 can selectively receive a desired application from among publicly open applications through a network.

The storage unit 440 can store programs for signal processing and control and store a processed video, audio or data signal.

In addition, the storage unit 440 can execute a function of temporarily storing a video, audio or data signal input from the external device interface 435 or the network interface 430.

The storage unit 440 can store information about a predetermined broadcast channel through a channel memory function.

The storage unit 440 can store an application or a list of applications input from the external device interface 435 or the network interface 430.

The storage unit 440 can store various platforms which will be described later.

The storage unit 440 can include storage media of one or more types, such as a flash memory type, a hard disk type, a multimedia card micro type, a card type memory (e.g. SD or XD memory), RAM, EEPROM, etc.

The digital receiver 400 can reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 can be included in the controller 470.

The user input interface 450 can transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown).

Here, the sensing unit (not shown) can include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 can include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 can control the tuner 410 to receive a signal of a channel selected in response to a predetermined channel selection command received through the user input interface 450. In addition, the controller 470 can process a video, audio or data signal corresponding to the selected channel. The controller 470 can control information on a channel selected by the user to be output with a processed video or audio signal through the display unit 480 or the audio output unit 485.

Alternatively, the controller 470 can control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content can be content stored in the digital receiver 400, received broadcast content, or content input from an external device. The content can include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital receiver 400 can further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 can convert a video signal, a data signal, and an OSD signal processed by the controller 470 and a video signal and a data signal received from the external device interface 435 into RGB signals to generate driving signals.

The display unit 480 can be a PDP, an LCD, an OLED, a flexible display, a 3D display or the like.

The display unit 480 can be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 can further include the sensing unit (not shown) for sensing a gesture of the user, which includes at least one of a touch sensor, a voice sensor, a position sensor, and an action sensor, as described above.

A signal sensed by the sensing unit (not shown) can be delivered to the controller 470 through the user input interface 450.

The digital receiver 400 can further include the photographing unit (not shown) for photographing the user. Image information acquired by the photographing unit (not shown) can be supplied to the controller 470.

The controller 470 can sense a gesture of the user from an image captured by the photographing unit (not shown) or a signal sensed by the sensing unit (not shown), or by combining the image and the signal.

The power supply unit 490 can supply power to the digital receiver 400.

Particularly, the power supply unit 490 can supply power to the controller 470 which can be implemented as a system-on-chip (SoC), the display unit 480 for displaying images, and the audio output unit 485 for audio output.

The remote controller 500 can transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 can be omitted or a component (not shown in FIG. 2) can be added as required. The digital receiver according to the present invention can not include the tuner and the demodulator, differently from the digital receivers shown in FIGS. 2 and 4, and can receive content through the network interface or the external device interface and reproduce the content.

Figure 5:
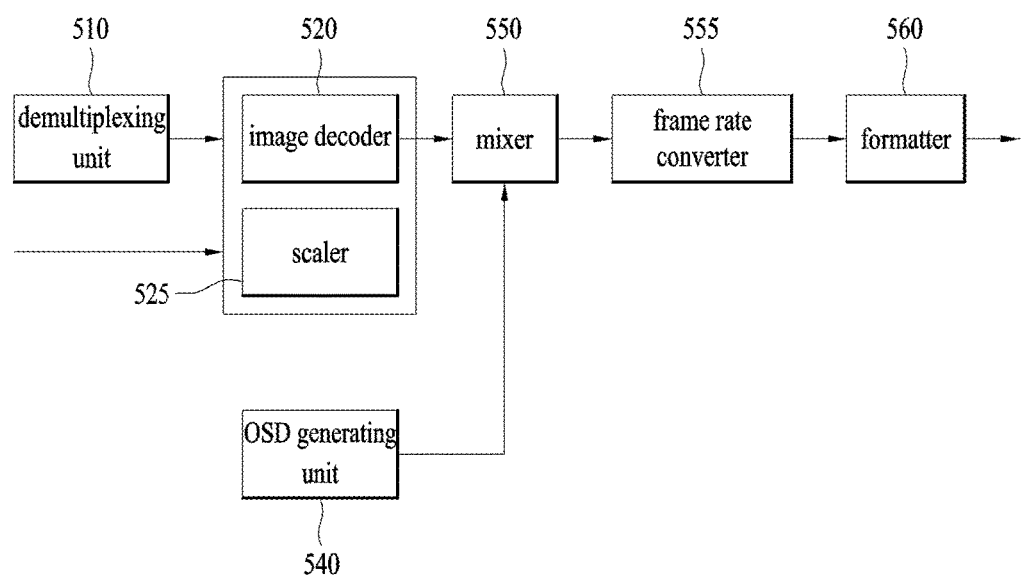
FIG. 5 is a block diagram showing the detailed configuration of each of controllers of FIGS. 2 to 4 according to one embodiment of the present invention.

FIG. 5 illustrates a digital receiver according to another embodiment of the present invention. Particularly, FIG. 5 shows a configuration for implementing a 3D digital receiver, which can be included in the configurations of FIGS. 2 through 4.

The digital receiver according to the present invention can include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor 420 can process a demultiplexed image signal using a video decoder 525 and a scaler 535.

The video decoder 525 can decode the demultiplexed image signal and the scaler 535 can scale the resolution of the decoded image signal such that the image signal can be displayed.

The image signal decoded by the image processor 520 can be input to the mixer 550.

The OSD generator 540 can generate OSD data automatically or according to user input. For example, the OSD generator 540 can generate data to be displayed on the screen of an output unit in the form of an image or text on the basis of a control signal of a user input interface.

OSD data generated by the OSD generator 540 can include various data such as a user interface image of the digital receiver, various menu screens, widget, icons, and information on ratings. The OSD generator 540 can generate a caption of a broadcast image or data for displaying EPG based broadcast information.

The mixer 550 can mix the OSD data generated by the OSD generator 540 and the image signal processed by the image processor 520. The mixer 550 can provide the mixed signal to the 3D formatter 560. By mixing the decoded image signal and the OSD data, OSD can be overlaid on a broadcast image or external input image.

The frame rate converter (FRC) 555 can convert a frame rate of input video. For example, the frame rate converter 555 can convert the frame rate of an input 60 Hz video to a frame rate of 120 Hz or 240 Hz, according to an output frequency of the output unit. The frame rate converter 555 can be bypassed when frame conversion is not executed.

The 3D formatter 560 can change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) can audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal can be EPG information including broadcast information such as the start time and end time (or duration) of a broadcast program which is broadcast through each channel.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital receiver is an example of image signal processors which process an image stored therein or an input image. Other examples of the image signal processors can include a set-top box (STB) which does not include the display unit 380 and the audio output unit 485 shown in FIG. 4, a DVD player, a Blu-ray player, a game device, a computer, etc.

Figure 6:
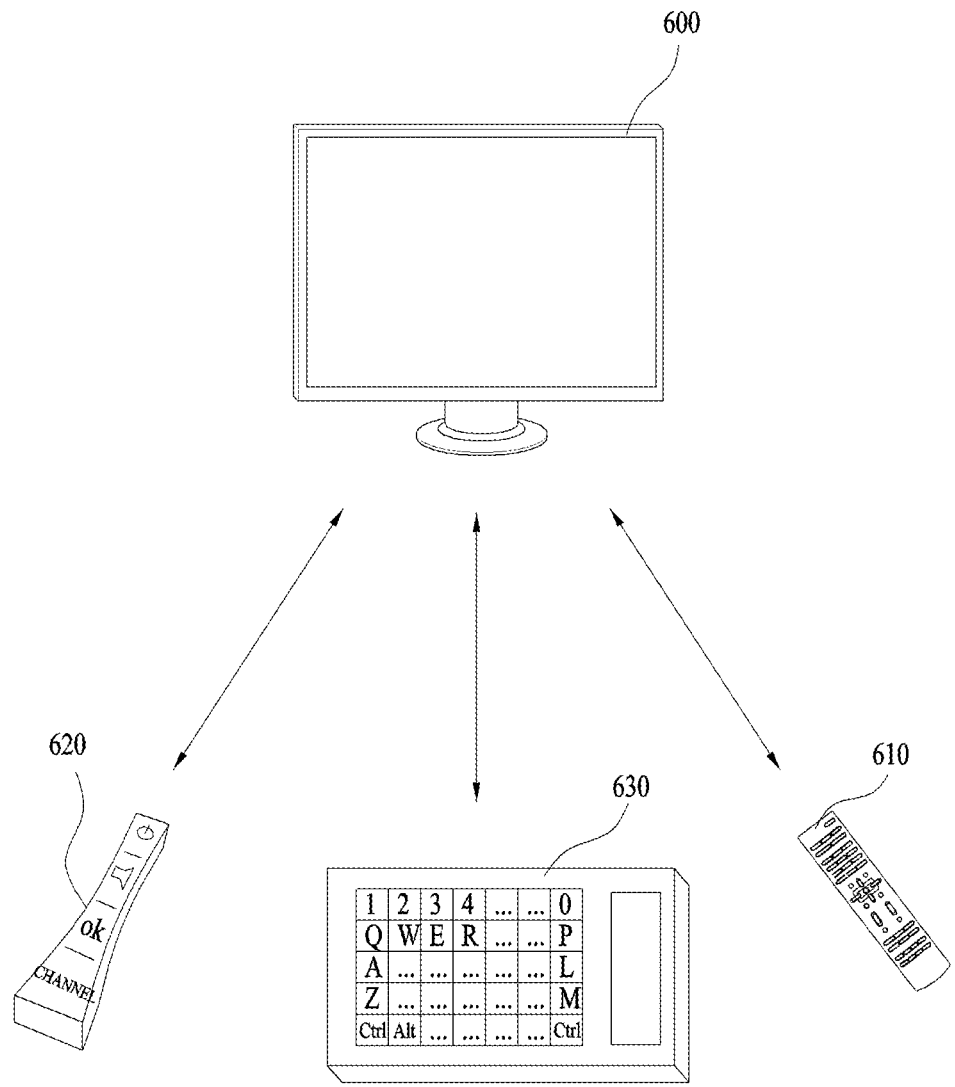
FIG. 6 is a diagram showing an input unit connected to each of the digital devices of FIGS. 2 to 4 according to one embodiment of the present invention.

FIG. 6 illustrates remote controllers of a digital receiver according to an embodiment of the present invention.

To execute various operations for implementing the present invention according to embodiments, various user interface devices (UIDs) which can communicate with a digital receiver 600 in a wired/wireless manner can be used as remote controllers.

UIDs can include a mobile device (e.g., a smart phone, a tablet PC, and the like), a magic remote controller 620 and a remote controller 630 equipped with a keyboard and a touch pad in addition to a general remote controller 610.

The remote controllers can use various communication protocols such as Bluetooth, RFID, IrDA, UWB, ZigBee, DLNA, etc.

The magic remote controller 620 can include a gyro sensor mounted therein to sense vibration of a user's hand or rotation.

That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

The digital device described in the present specification uses Web OS as a platform. Hereinafter, a Web OS based process or algorithm can be performed by the controller of the above-described digital device.

The controller includes the controllers of FIGS. 2 to 5 and has wide concepts. Accordingly, hereinafter, a component for processing Web OS based services, applications, content, etc., including software, firmware or hardware in a digital device is referred to a controller.

Such a Web OS based platform can improve development independency and functional extensibility by integrating services, applications, etc. based on a Luna-service bus, for example, and increase application development productivity based on web application framework. In addition, system resources, etc. can be efficiently used via a Web OS process and resource management to support multitasking.

A Web OS platform described in the present specification can be available not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
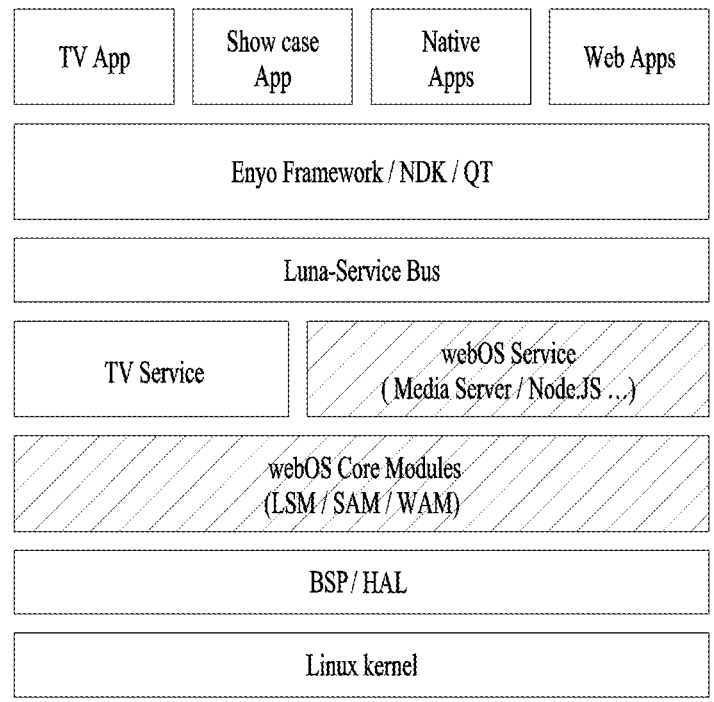
FIG. 7 is a diagram illustrating Web OS architecture according to one embodiment of the present invention.

FIG. 7 is a diagram illustrating Web OS architecture according to one embodiment of the present invention.

The architecture of a Web OS platform will now be described with reference to FIG. 7.

The platform can be largely divided into a kernel, a system library based Web OS core platform, an application, a service, etc.

The architecture of the Web OS platform has a layered structure. OSs are provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a Web OS core modules layer, a service layer, a Luna-service bus layer and an Enyo framework/native developer's kit (NDK)/QT layer are sequentially provided. At the highest layer, an application layer is provided.

Some layers of the above-described Web OS layered structure can be omitted and a plurality of layers can be combined to one layer and one layer can be divided into a plurality of layers.

The Web OS core module layer can include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM can control display hardware (HW) and provide a buffer for rendering content necessary for applications, and compose and output results of rendering a plurality of applications on a screen.

The SAM manages policy according to several conditions of systems and applications.

The WAM is based on Enyo framework, because a Web OS regards a web application as a basic application.

An application can use a service via a Luna-service bus. A service can be newly registered via a bus and the application can detect and use a desired service.

The service layer can include services having various service levels, such as a TV service, a Web OS service, etc. The Web OS service can include a media server, Node.JS, etc. and, in particular, the Node.JS service supports JavaScript, for example.

The Web OS service can be communicated to a Linux process implementing function logic via a bus. This Web OS service is largely divided into four parts, migrates from a TV process and an existing TV to a Web OS, is developed as services which differ between manufacturers, Web OS common services and JavaScripts, and is composed of the Node.js service used via Node.js.

The application layer can include all applications supportable by a digital device, such as a TV application, a showcase application, a native application, a web application, etc.

Applications on the Web OS can be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or can be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C) such as games. For example, the PDK application can be used to develop applications requiring high performance.

The QML application is a Qt based native application and includes basic applications provided along with the Web OS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
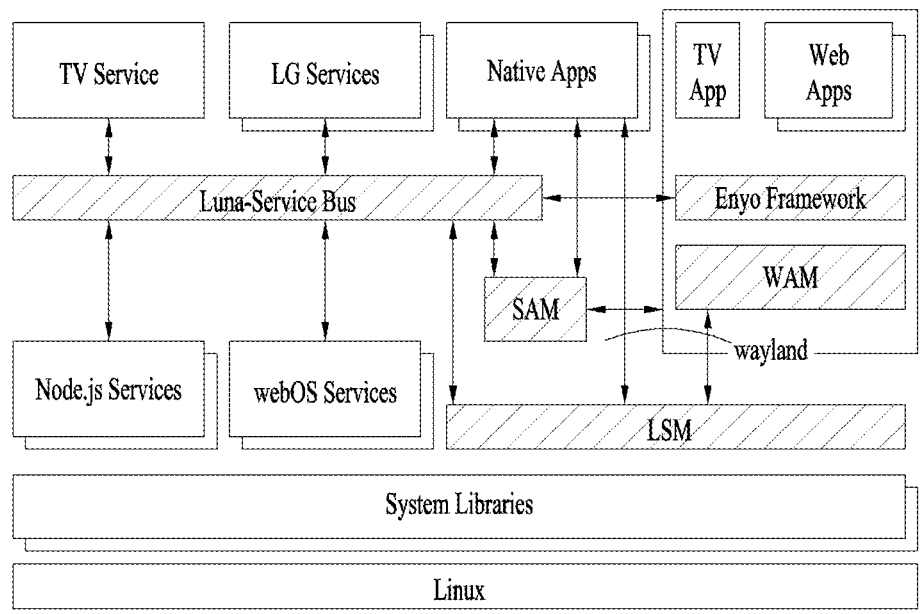
FIG. 8 is a diagram illustrating architecture of a Web OS device according to one embodiment of the present invention.

FIG. 8 is a diagram illustrating the architecture of a Web OS device according to one embodiment of the present invention.

FIG. 8 is a block diagram based on a runtime of a Web OS device and is described with reference to the layered structure of FIG. 7.

Hereinafter, a description will be given with reference to FIGS. 7 and 8.

Referring to FIG. 8, services, applications and Web OS core modules are included on a system OS (Linux) and system libraries and communication therebetween can be performed via a Luna-service bus.

Node.js services based on HTML5 such as e-mail, contact or calendar, CSS, JavaScript, etc., Web OS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, now on, notification, search, auto content recognition (ACR), contents list browser (CBOX), wfdd, DMR, remote application, download, Sony Philips digital interface format (SDPIF), etc., native applications such as PDK applications, browsers, QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX can manage metadata and lists of content of external devices such as USB drivers, DLNA devices or Cloud servers connected to a TV. The CBOX can output content listing of various content containers such as USB, DMS, DVR, Cloud server, etc. as an integrated view. The CBOX can display various types of content listings such as pictures, music or video and manage metadata thereof. The CBOX can output content of an attached storage in real time. For example, if a storage device such as a USB is plugged in, the CBOX should immediately output a content list of the storage device. At this time, a standardized method for processing the content listing can be defined. The CBOX can accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and can provide a window management mechanism for 21:9 and a multi-window.

The LSM supports implementation of a system UI based on a QML and improves development productivity. QML UX can easily configure a view using a screen layout and UI components based on MVC and easily develop code for processing user input. An interface between the QML and the Web OS component is achieved via a QML extensibility plug-in and graphic operation of an application can be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. can be included as an input manager.

The LSM supports multiple window models and can be simultaneously executed in all applications as a system UI. The LSM can support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, auto content recognition (ACR), etc.

Figure 9:
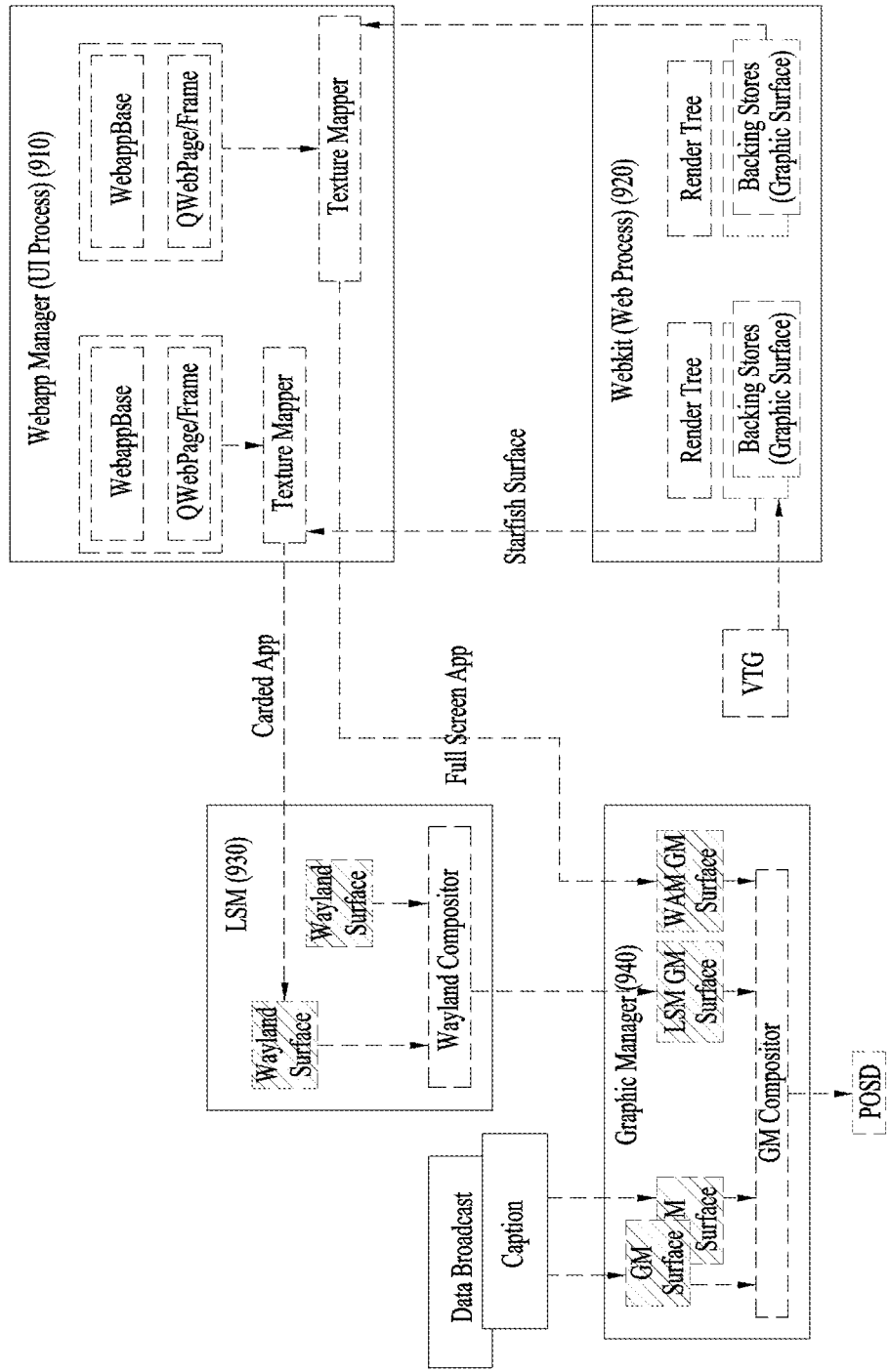
FIG. 9 is a diagram illustrating a graphic composition flow in a Web OS device according to one embodiment of the present invention.

FIG. 9 is a diagram illustrating a graphic composition flow in a Web OS device according to one embodiment of the present invention.

Referring to FIG. 9, graphic composition processing can be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a full-screen application. The web application manager 910 receives an application generated by the WebKit 920 in order to share a graphic processing unit (GPU) memory for graphic management between the UI process and the web process and delivers the application to the LSM 930 if the application is not a full-screen application. If the application is a full-screen application, the LSM 930 can bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The full-screen application is directly delivered to the graphics manager 940 without passing through the LSM 930 as described above and is processed in the graphics manager compositor via the WAM GM surface.

The graphics manager processes and outputs all graphics data in the Web OS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
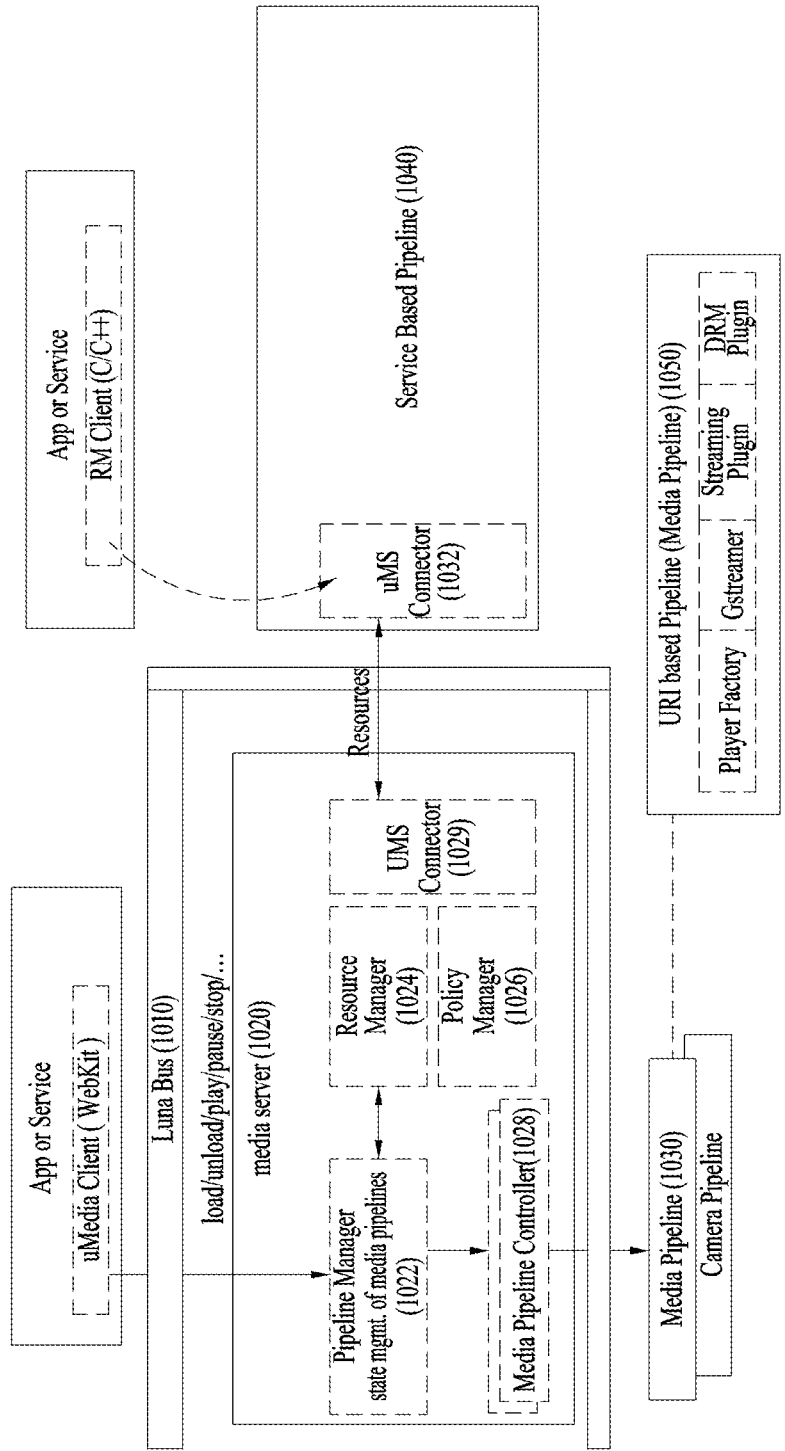
FIG. 10 is a diagram illustrating a media server according to one embodiment of the present invention.
Figure 11:
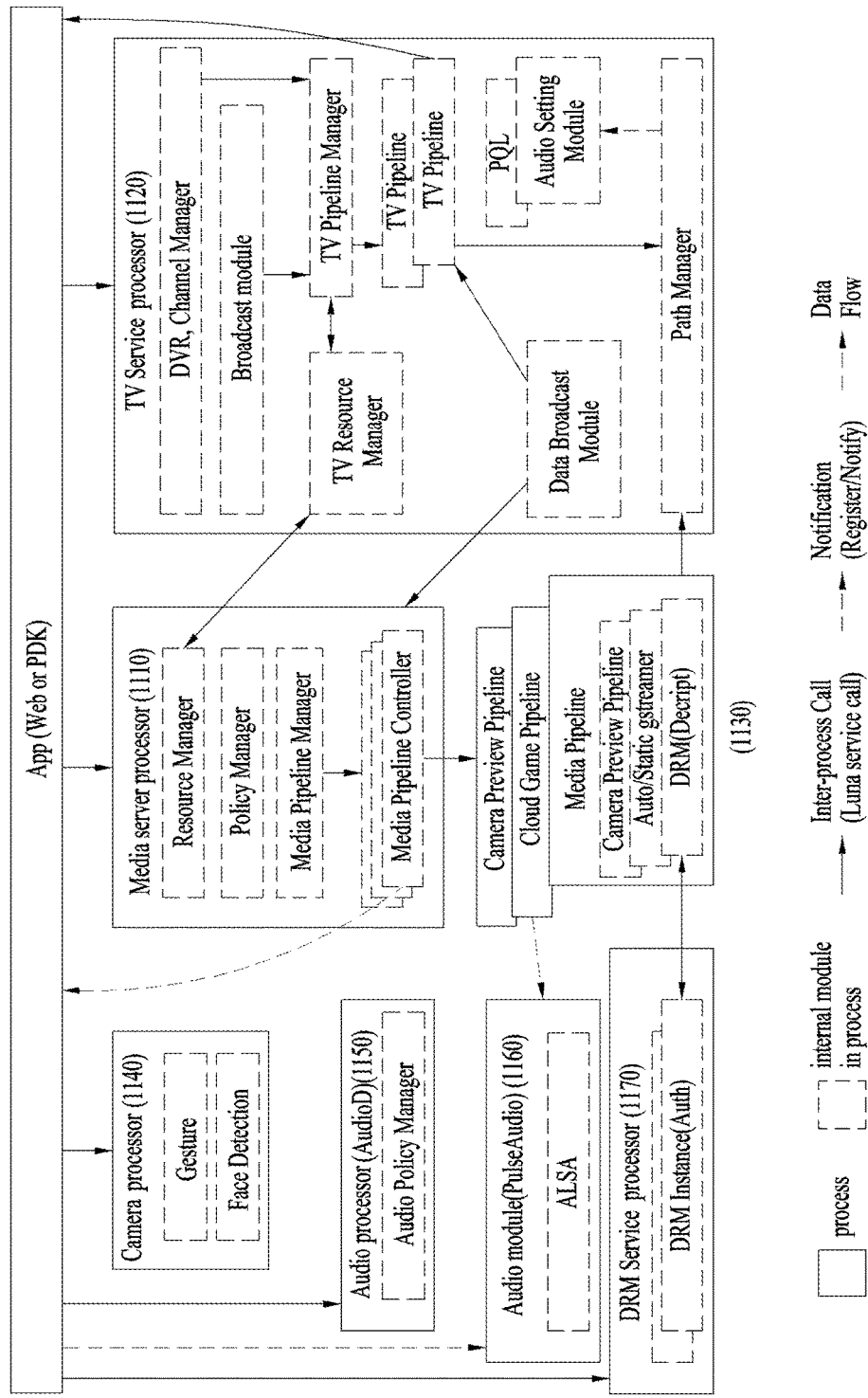
FIG. 11 is a block diagram showing the configuration of a media server according to one embodiment of the present invention.
Figure 12:
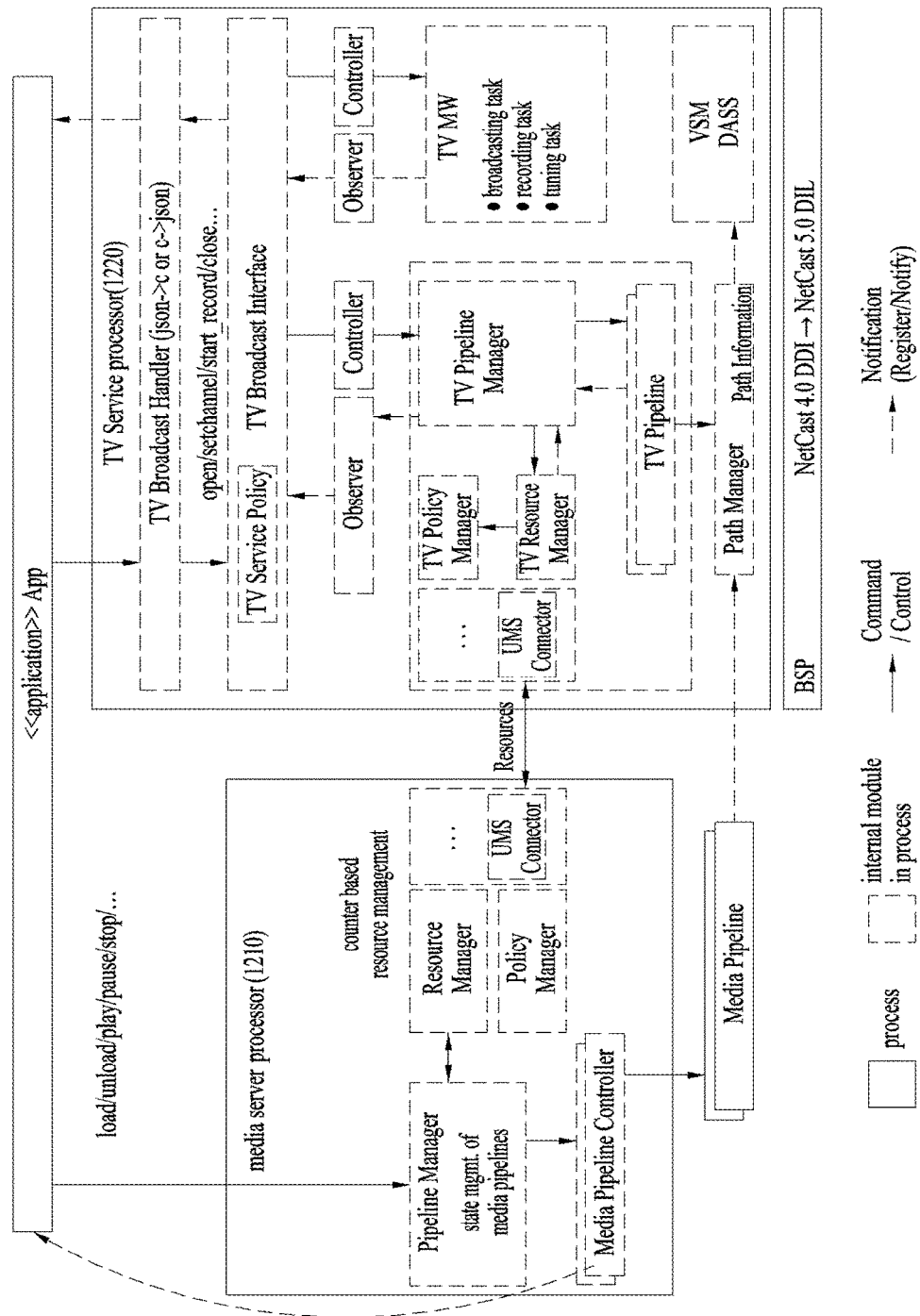
FIG. 12 is a diagram illustrating a relationship between a media server and a TV service according to one embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server can efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server can make system stability robust, and can remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions can be changed according to media type, etc.

The media server can have extensibility and can add a new type of pipeline without influencing an existing implementation method. For example, the media server can accommodate a camera pipeline, a video conference (Skype) pipeline, a third-party pipeline, etc.

The media server can process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server can control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server can have identifiers (IDs) for all operations related to playback. For example, the media server can send a command to a specific pipeline based on the ID. The media server can send respective commands to pipelines for playback of two or more media.

The media server is responsible for playing back a HTML5 standard media.

The media server performs a service process of a TV pipeline according to a TV restructuralization range. The media server can be designed and implemented regardless of the TV restructuralization range. If the separate service process of the TV is not performed, the TV can be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server can manage pipeline controller resources.

The media server supports extensibility, reliability, efficient resource usage, etc., for example.

In other words, the uMS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server can manage and control generation, deletion, use of a pipeline for resource management.

The pipeline can be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and can exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and can include all status data related to the video operation, such as loading, unloading, play (playback or reproduction), pause, stop, etc. Such video operations or statuses can be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment can be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop can be generated. The pipeline includes pipelines for HTML5, web CP, Smarthshare playback, thumbnail extraction, NDK, cinema, multimedia and hypermedia information coding experts group (MHEG), etc.

The pipeline can include a service-based pipeline and a URI based pipeline (media pipeline), for example.

Referring to FIG. 10, the application or service including the RM client cannot be directly connected to the media server 1020, because the application or service can directly process a media. In other words, if the application or service directly processes a media, the media server cannot be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service can cope with the request of the RM client via resource management of the resource manager 1024 via the uMS connector. The RM client can process services such as native CP, TV service, second screen, flash player, You Tube media source extensions (MSE), cloud game, Skype, etc. In this case, as described above, the resource manager 1024 can manage resources via appropriate data communication with the policy manager 1026 if necessary for resource management.

The URI based pipeline does not directly process the media unlike the above-RM client but processes the media via the media server 1020. The URI based pipeline can include player factory, Gstreamer, streaming plug-in, digital rights management (DRM) plug-in pipelines.

An interface method between the application and the media services is as follows.

An interface method using a service in a web application can be used. In this method, a Luna call method using a palm service bridge (PSB) and a method of using Cordova can be used, in which a display is extended to a video tag. In addition, a method of using HTML5 standard related to a video tag or media element can be used.

A method of using a service in PDK can be used.

Alternatively, a method of using in existing CP can be used. For backward compatibility, plug-in of an existing platform can be extended and used based on Luna.

Lastly, an interface method using a non-Web OS can be used. In this case, a Luna bus can be directly called to perform interfacing.

Seamless change is processed by a separate module (e.g., TVWIN) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 can generate a pipeline via a media server processor 1110 with respect to data which requires use of a pipeline according to user selection or automatically and process the data.

Alternatively, if the application includes audio data, the audio can be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 can include an audio policy manager to determine processing of the audio data. The processed audio data is processed by the audio module 1160. The application or a pipeline related thereto can notify the audio module 1160 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1170 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 can include a TV broadcast handler, a TV broadcast interface, a service processor, TV middleware (MW), a path manager and a BSP (NetCast). The service processor can mean a module including a TV pipeline manager, a TV resource manager, a TV policy manager, a USM connector, etc., for example.

In the present specification, the TV service processor can have the configuration of FIG. 11 or FIG. 12 or a combination thereof. Some components can be omitted or other components (not shown) can be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface can transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager can be controlled by the TV policy manager, in order to request a resource assignment status for a TV service according to a request for generation of a TV pipeline of the TV pipeline manager, and can perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager can be notified that assignment of all resources is completed. At this time, the resource manager in the media server processor can remove a predetermined TV pipeline according to a predetermined criterion or priority of TV pipelines already assigned for the TV service along with notification and request generation of a TV pipeline for the requested TV service. Alternatively, the TV resource manager can appropriately remove a TV pipeline or can add or newly establish a TV pipeline according to a status report of the resource manager in the media server processor 1110/1210.

The BSP supports backward compatibility with an existing digital device.

The generated TV pipelines can appropriately operate under control of the path manager in the processing procedure. The path manager can determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. can be generated. The media pipeline can include streaming protocol, auto/static gstreamer, DRM, etc. and the processing flow thereof can be determined under control of the path manager. For a detailed description of the processing procedure of the media server processor 1110/1210, refer to the description of FIG. 10 and a repeated description will be omitted. In the present specification, the resource manager in the media server processor 1110/1210 can perform resource management to a counter base, for example.

The multimedia device described in the present invention may include, for example, a TV, a smart TV, a Hybrid Broadcast Broadband Television (HBBTV), a network TV, a web TV, an Internet Protocol Television (IPTV), a personal computer (PC), a tablet PC, a laptop computer, a Netbook, a portable multimedia player (PMP), a smartphone, a smart watch, smart glasses, a navigation system, etc.

Figure 13:
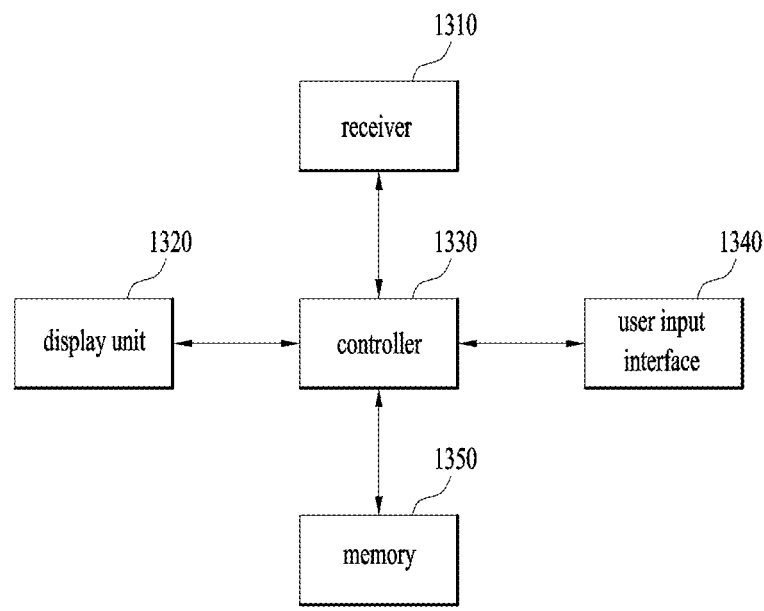
FIG. 13 is a block diagram illustrating constituent modules of a multimedia device according to an embodiment of the present invention.

FIG. 13 is a block diagram illustrating constituent modules of a multimedia device according to an embodiment of the present invention.

Referring to FIG. 13, the multimedia device according to an embodiment of the present invention may include a receiver 1310, a display unit 1320, a controller 1330, a user input interface unit 1340, a memory 1350, etc. The constituent modules shown in FIG. 13 and the other constituent modules not shown in FIG. 13 may refer to FIGS. 1 to 12.

The receiver 1310 may receive a broadcast signal, content, etc. including broadcast program data from a broadcast station or the content provider (CP), and may receive the service, the application, the content, etc. from the external server over the network. The receiver 1310 may be implemented by at least one of the network interface unit 210 of FIG. 2, the wireless communication unit 310 of FIG. 3, and the receiver 405 of FIG. 4.

The display unit 1320 may display video data, graphic data, image data, etc. corresponding to content received in the receiver 1310. In addition, the display unit 1320 may display video data, graphic data, and image data pre-stored in the memory 1350. The display unit 1320 may be implemented by at least one of the display unit 208 of FIG. 2, the display unit 351 of FIG. 3, and the display unit 480 of FIG. 4.

The user input interface unit 1340 may receive a specific command from the user. The user input interface unit 1340 may receive a control signal for controlling the multimedia device from the remote controllers (610, 620, 630). If the display unit 1320 includes a touchscreen, the display unit 1320 may receive a control signal for controlling the multimedia device through the touchscreen. The user input interface unit 1340 may be implemented by at least one of the user interface (UI) manager 214 of FIG. 2, the user input unit 330 of FIG. 3, and the user interface unit 450 of FIG. 4.

The memory 1350 may store a variety of programs, applications, algorithms, etc. needed for operating the multimedia device. The memory 1350 may store content, programs, data, application, etc. received through the receiver 1310. The memory 1350 may be implemented by at least one of the SI & metadata database (DB) 211 of FIG. 2, the memory 360 of FIG. 3, and the storage 440 of FIG. 4.

The controller 1330 may control the operation of the multimedia device, and may manage the functions of the receiver 1310, the display unit 1320, the user input interface unit 1340, and the memory 1350. The controller 1330 may include a decoder configured to process video data and audio data of the content received through the receiver 1310.

In accordance with the embodiment, the controller 1330 may recognize the object contained in images, graphic data, video data, etc., and may detect object information on the basis of the recognized object. For example, the object may include any one of a letter, a figure, and a numeral. For example, the controller 1330 may capture a screen image displayed on the display unit 1420, may recognize the object contained in the captured image, may detect object information on the basis of the recognized object, and may store the detected object in the memory 1350. The memory 1350 may store the program and/or algorithm for recognizing the object and detecting object information. For example, the controller 1330 may detect the object and detect object information by optical character recognition (OCR).

The controller 1330 may be implemented by at least one of the TCP/IP manager 201, the service delivery manager 203, the SI decoder 204, the demultiplexer (DEMUX) 205, the audio decoder 206, the video decoder 207, the service control manager 209, the service discovery manager 210, and the service manager 213 shown in FIG. 2, the controller 380 shown in FIG. 3, the controller 470 shown in FIG. 4, the media server 1020 shown in FIG. 10, the media server processor 1110 and the TV service processor 1120 shown in FIG. 11, and the media server processor 1210 and the TV service processor 1220 shown in FIG. 12.

In accordance with the embodiment of the present invention, the controller 1330 may pre-store information corresponding to a specific user in the memory 1350. If the stored information corresponding to the specific user is input through the user input interface unit 1340, a user may log in with an account of the specific user. A detailed description thereof will hereinafter be described with reference to FIGS. 14 to 18.

Figure 14:
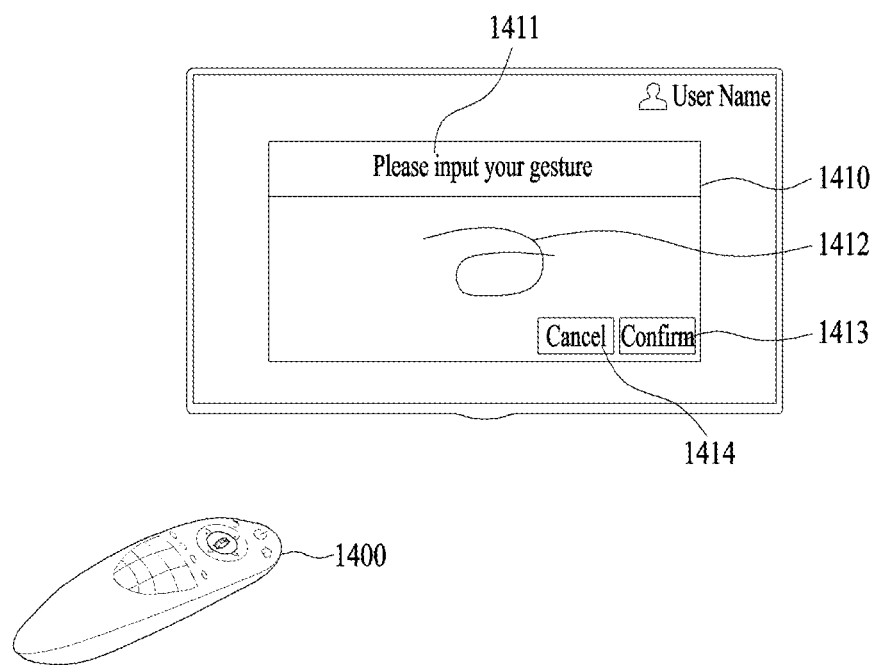
FIG. 14 is a conceptual diagram illustrating a method for storing information regarding a specific user in a memory of the multimedia device according to an embodiment of the present invention.

FIG. 14 is a conceptual diagram illustrating a method for storing information regarding a specific user in a memory of the multimedia device according to an embodiment of the present invention.

The controller 1330 of the multimedia device may output a first GUI 1410 for registering user information to the display unit 1320 when a menu for registering user information is executed. The first GUI 1410 may be displayed after the name and/or ID of a specific user is registered, or may also be displayed before the name and/or ID of the specific user is registered. For example, the first GUI 1410 may be used when the pattern corresponding to a specific user is input as information regarding the specific user.

The first GUI 1410 may include a guide message 1411 for commanding a user to input a predetermined pattern by moving the remote controller 1400.

The user who presses a specific key contained in the remote controller 1400 moves the remote controller 1400, such that the user can draw a desired pattern. The user who touches the touchpad contained in the remote controller 1400 moves the remote controller 1400, such that the user can draw a desired pattern.

Through the user input interface unit 1340, the controller 1330 may receive a signal corresponding to a specific key contained in the remote controller 1400, and may also receive a signal corresponding to the movement of the remote controller 1400. The controller 1330 may display a trace 1412 corresponding to movement of the remote controller 1400 (i.e., a trace 1412 corresponding to a user-input pattern) on the first GUI 1410 on the basis of the signal corresponding to the received movement of the remote controller 1400.

The user may select a confirmation button (Confirm) 1413 when the trace 1411 displayed on the first GUI 1410 is identical to a user desired pattern. If the trace 1411 displayed on the first GUI 1410 is different from the user desired pattern or the user desires to change a current pattern to another pattern, the user may select a cancel button 1414.

If the user selects the confirmation button 1413 contained in the first GUI 1410 using the remote controller 1400, the controller 1330 may map the pattern corresponding to the trace 1411 to a specific user, and may store the mapped result in the memory 1350. For example, the controller 1330 may map the pattern corresponding to the trace 1411 to a name or ID of a specific user, and may store the mapped result in the memory 1350.

FIG. 15 is a conceptual diagram illustrating a login method using a specific user account for use in a multimedia device according to an embodiment of the present invention. The user who presses a specific key contained in the remote controller 1400 may draw the registered predetermined pattern by moving the remote controller 1400, as shown in FIG. 14. The user who desires to log in with his or her account may input a predetermined pattern to the remote controller 1400, irrespective of the current screen image 1510 displayed on the display unit 1320 of the multimedia device.

The controller 1330 of the multimedia device may receive a signal corresponding to a specific key contained in the remote controller 1400 or a signal corresponding to the movement of the remote controller 1400, through the user input interface unit 1340. The controller 1330 may display a trace 1520 corresponding to movement of the remote controller 1400 (i.e., a trace 1520 corresponding to a predetermined pattern stored in the memory 1350) on the display unit 1320, on the basis of the received movement of the remote controller 1400. The trace 1520 may be displayed on the current screen image displayed on the display unit 1320.

If the trace 1520 corresponds to a predetermined pattern stored in the memory 1350, the controller 1330 may log in with a user account mapped to the predetermined pattern. A detailed description thereof will hereinafter be given with reference to FIGS. 19 to 34.

FIG. 16 is a conceptual diagram illustrating another method for storing information regarding a specific user in a memory of the multimedia device according to an embodiment of the present invention.

Referring to FIG. 16, if a menu for registering user information is executed, the controller 1330 of the multimedia device may output a second GUI 1610 for registering user information on the display unit 1320. The second GUI 1610 may be displayed after the name and/or ID of a specific user is registered, or may also be displayed before the name and/or ID of the specific user is registered. For example, the second GUI 1610 may be used to input an image (face) of the specific user, as information regarding the specific user.

The second GUI 1610 may include a guide message 1611 indicating that the image is captured for registration of the user face.

The controller 1330 may activate a camera embedded in the multimedia device, may capture the user image using the activated camera, and may display the captured image 1622 on the second GUI 1610. In accordance with the embodiment, the controller 1330 may receive a user image from the external device, and may display the received image on the second GUI 1610.

If the user desires to register the image 1622 as user information, the user may select the confirmation button 1613. If the user desires to re-capture the image 1622, the user may select the cancel button 1614.

If the user selects the confirmation button 1613 contained in the second GUI 1610 using the remote controller 1400, the controller 1330 may map the image 1622 to the specific user, and may store the mapped result in the memory 1350. For example, the controller 1330 may map the image 1622 to the name or ID of the specific user, and may store the mapped result in the memory 1350.

If the specific user desires to use the multimedia device in future, the controller 1330 may activate the camera, and may recognize the face of the image captured by the activated camera. If the recognized face corresponds to the image 1622 stored in the memory 1350, the user may log in with an account of the specific user.

FIG. 17 is a conceptual diagram illustrating another method for storing information regarding a specific user in a memory of the multimedia device according to an embodiment of the present invention.

Referring to FIG. 17, if the menu for registering user information is executed, the controller 1330 of the multimedia device may display a third GUI 1710 for registering the user information on the display unit 1320. The third GUI 1710 may be displayed after the name and/or ID of a specific user is registered, or may also be displayed before the name and/or ID of the specific user is registered. For example, the third GUI 1710 may be used to input a voice signal of the specific user, as information regarding the specific user.

The third GUI 1710 may include a guide message 1711 for registering a user voice signal of the user.

The controller 1330 may activate a microphone embedded in the multimedia device, and may acquire audio data including the user voice using the activated microphone. In accordance with the embodiment, the controller 1330 may receive audio data including the user voice from the external device (e.g., the remote controller 1400).

If recording of the user voice is completed, the user may select the confirmation button 1713. If the user re-desires to record his or her voice, the user may select the cancel button 1714.

If the user selects the confirmation button 1713 contained in the third GUI 1710 using the remote controller 1400, the controller 1330 may map the acquired audio data to the specific user, and may store the mapped result in the memory. For example, the controller 1330 may map the acquired audio data to the name or ID of the specific user, and may store the mapped result in the memory 1350.

If the specific user desires to use the multimedia device in future, the controller 1330 may activate the microphone, and may analyze audio data acquired by the activated microphone. If the signal waveform or the like of the analyzed audio data corresponds to the signal waveform of the audio data stored in the memory 1350, the user may log in with an account of the specific user.

FIG. 18 is a conceptual diagram illustrating another method for storing information regarding a specific user in a memory of the multimedia device according to an embodiment of the present invention.

Referring to FIG. 18, if the menu for registering user information is executed, the controller 1330 of the multimedia device may output a fourth GUI 180 for registering user information to the display unit 1320. The fourth GUI

1810 may be displayed after the name and/or ID of the specific user is registered, or may also be displayed before the name and/or ID of the specific user is registered. For example, the fourth GUI 1810 may be used to input a voice signal of the specific user, as information regarding the specific user.

The fourth GUI 1810 may include a guide message 1811 needed to register a user fingerprint.

The user's finger contacts a fingerprint recognition pad contained in the remote controller 1400 for a predetermined time or longer, such that the user can input his or her fingerprint to the remote controller 1400. The controller 1330 may receive data corresponding to the input fingerprint from the remote controller 1400, through the user input interface unit 1340.

If the fingerprint input is completed, the controller 1330 may select the confirmation button 1813. If the user re-desires to input his or her fingerprint, the user may select the cancel button 1814.

If the user selects the confirmation button 1813 contained in the fourth GUI 1810 using the remote controller 1400, the controller 1330 may map data corresponding to the received fingerprint to the specific user, and may store the mapped result in the memory 1350. For example, the controller 1330 may map data corresponding to the received fingerprint to the name or ID of the specific user, and may store the mapped result in the memory 1350.

If the specific user desires to use the multimedia device in future, the controller 1330 may receive data corresponding to a predetermined fingerprint from the remote controller 1400. If data corresponding to the received fingerprint corresponds to data corresponding to the fingerprint stored in the memory 1350, the user may log in with the account of the specific user.

As can be seen from FIGS. 14 to 18, the user need not input complicated passwords (e.g., numbers, letters, etc.) to log in with his or her account, resulting in increased user convenience.

Figure 19:
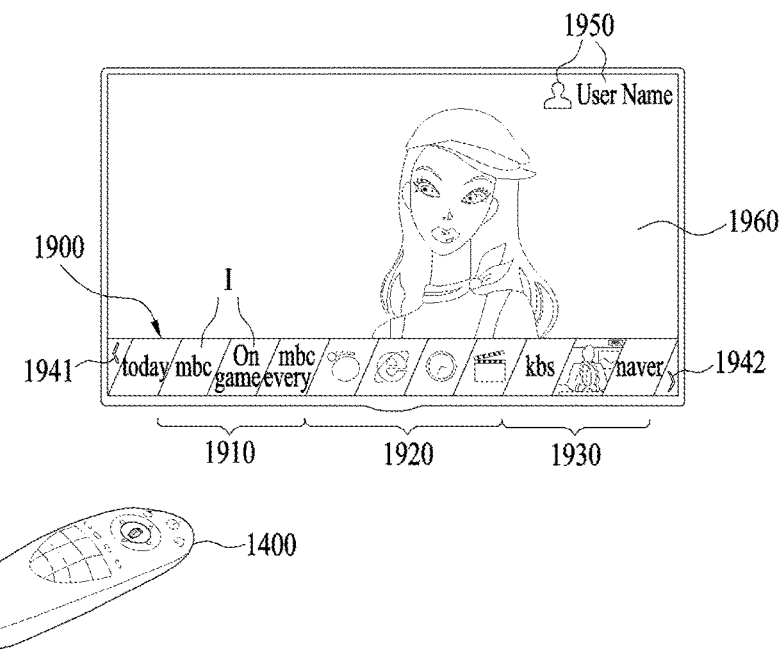
FIG. 19 illustrates one example of a screen image displayed on a display unit when a user logs in with a specific user account in the multimedia device according to an embodiment of the present invention.

FIG. 19 illustrates one example of a screen image displayed on a display unit when a user logs in with a specific user account in the multimedia device according to an embodiment of the present invention.

Referring to FIG. 19, if the user inputs specific information corresponding to the specific user information pre-stored in the memory 1340, the controller 1330 of the multimedia device may log in with the account of the specific user. In addition, the controller 1330 may output the menu bar 1900 corresponding to the login specific user account on the display unit 1320. The specific user information stored in the memory 1340 is similar to those of FIGS. 14 to 18, and as such a detailed description thereof will herein be omitted for convenience of description. For example, the menu bar 1900 may be displayed at any one of the upper end, the lower end, the left end, and the right end of the screen of the display unit 1320.

The operation for logging in using the specific user account may indicate that the environment customized for the specific user can be provided to the user who uses the multimedia device. The environment customized for the specific user may be established or changed by the specific user, and may also be established or changed by the controller 1330 on the basis of history information obtained when the specific user uses the multimedia device.

After the user logs in with a specific user account, the controller 1330 may automatically output the above menu bar 1900 to the display unit 1320. After the user logs in with the specific user account, the controller 1330 may output the menu bar 1900 to the display unit 1320 upon receiving a predetermined signal for calling the menu bar from the remote controller 1400.

The menu bar 1900 may be associated with a channel designated as a preferred channel decided by the specific user, a channel having a history indicating that the specific user views the channel for a predetermined time or longer, an application having a history indicating that the application is executed at least a predetermined number of times by the specific user, a content recommended to the specific user, an application recommended to the specific user, and a channel recommended to the specific user.

The menu bar 1900 may include a plurality of icons (I) corresponding to respective channels, respective contents, and respective applications. Although the region of each menu contained in the menu bar 1900 is referred to as the icon (I) for convenience of description, each region may be referred to by another name, for example, a card, a tile, a thumbnail, a piece, or the like.

Since there are a large number of icons (I) contained in the menu bar 1900, it is impossible to simultaneously display many icons (I) on the single screen. In another example, if the menu bar 1900 includes a plurality of pages, the indicators (1941, 1942) for confirming the icons (I) not displayed on the single screen and/or the icons (I) displayed on the other page may further be used. If the indicators (1941, 1942) are selected by the remote controller 1400, the controller 1330 may horizontally scroll the icons shown in FIG. 19 or may output the menu bar 1900 including the icons (I) belonging to another page to the display unit 1320.

In accordance with the embodiment, if the icons (I) from among the icons (I) contained in the menu bar 1900 are present, and if the indicators (1941, 1942) are selected by the remote controller 1400, the controller 1330 may horizontally scroll the remaining icons other than the above predetermined icons (I). That is, if the predetermined icons (I) from among the icons (I) contained in the menu bar 1900 are present, although the indicators (1941, 1942) are selected by the remote controller 1400, the positions of the predetermined icons (I) may be fixed in the menu bar 1900.

For example, the menu bar 1900 may include any one of a first region 1910, a second region 1920, and a third region 1930. The first region 1910 may include icons (I) corresponding to at least one of a channel corresponding to a preferred channel decided by the specific user and a channel having a history indicating that the specific user views the channel for a predetermined time or longer. The second region 1920 may include icons (I) corresponding to an application having a history indicating that the specific user executes the application at least a predetermined number of times. The third region 1930 may include icons (I) corresponding to at least one of the applications recommended to the specific user and a channel recommended to the specific user.

After the specific user logs in with his or her account, the controller 1330 may monitor at least one of a viewing history indicating channels and programs capable of being viewed by the multimedia device, an execution history of applications capable of being used by the multimedia device, and an execution history of contents capable of being used by the multimedia device. Then, the controller 1330 may change a structure of the above menu bar 1900 after lapse of a predetermined time.

In accordance with the embodiment, the controller 1330 may also change the structure of the menu bar 1900 on the basis of the above monitoring result while the menu bar 1900 is displayed on the display unit 1330, and output the changed menu bar 1900 on the display unit 1330. Alternatively, the controller 1330 may not change the structure of the menu bar 1900 when the menu bar 1900 is displayed on the display unit 1330. When a predetermined signal for calling the menu bar from the remote controller 1400 is received after the output of the menu bar 1900 is released, and when the menu bar 1900 is then re-displayed, the controller 1330 may change the structure of the menu bar 1900 according to the above monitoring result, and output the changed menu bar 1900.

In more detail, the controller 1330 may change at least one of the type of icons (I) contained in the menu bar 1900 and the order of icons (I) enumerated on the menu bar 1900 according to the lapse of time on the basis of the monitoring result. In this case, changing the type of icons (1) may indicate that a user preferred channel, a user preferred application, a user preferred content, etc. have been changed. Changing the order of icons (I) may indicate that the order of user preferred channels, the order of user preferred applications, the order of user preferred contents, etc. have been changed. In accordance with the embodiment, if the predetermined icon (I) from among the icons (I) contained in the menu bar 1900 is present, the controller 1330 may fix the position of the predetermined icon (I) in the menu bar 1900 irrespective of the monitoring result.

In accordance with the embodiment, when the user logs in with the specific user account, the controller 1330 may also display graphic data 1950 for informing the user of the login state on the display unit 1320 during a predetermined time.

In accordance with the embodiment, assuming that the login state based on the specific user account is achieved, the controller 1330 may maintain the screen image 1960 displayed on the display unit 1320 before the login state based on the specific user account, even when the login state based on the specific user account is achieved, and may then overlay the menu bar 1900 on the screen 1960 and output the overlay resultant image. For example, if the user views the channel #6 before logging in with the specific user account, the screen corresponding to the channel #6 may be continuously displayed on the display unit 1320 in so far as the user does not change a current channel or a current screen image after the user logs in with the specific user account.

Figure 20:
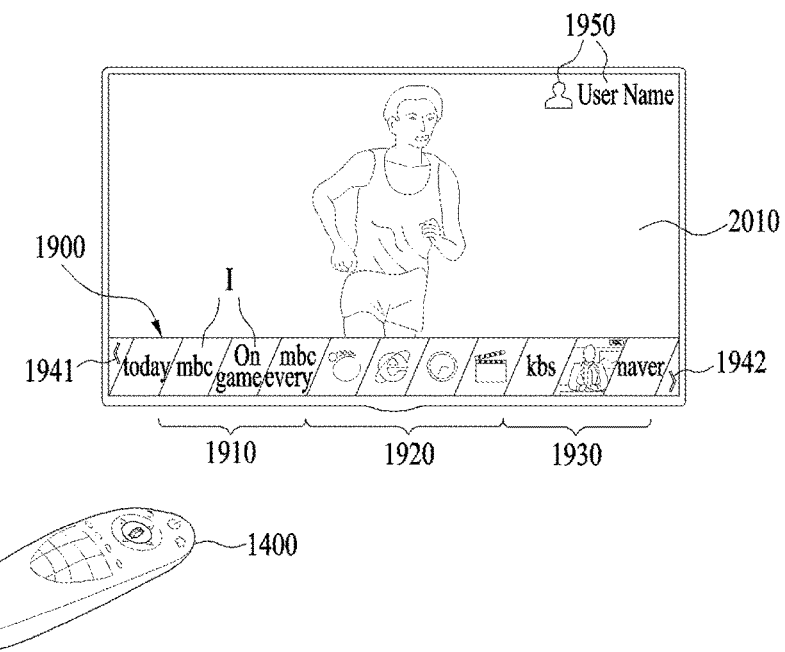
FIG. 20 illustrates another example of a screen image displayed on a display unit when a user logs in with a specific user account in the multimedia device according to an embodiment of the present invention.

FIG. 20 illustrates another example of a screen image displayed on a display unit when a user logs in with a specific user account in the multimedia device according to an embodiment of the present invention. The same contents as those of FIG. 19 will herein be omitted for convenience of description, and the example of FIG. 20 will hereinafter be described centering on the difference between FIG. 19 and FIG. 20.

If information corresponding to the specific user information stored in the memory 1340 is input to the controller 1330 of the multimedia device, the controller 1330 may log in with the specific user account. The controller 1330 may output the menu bar 1900 corresponding to the login specific user account to the display unit 1320.

If a specific user logs in with the specific user account, the controller 1330 may automatically switch a current channel to the most favorite channel (e.g., Channel #11) of the specific user, and may display video data 2010 contained in a broadcast signal corresponding to the switched channel on the display unit 1320. The controller 1330 may display the menu bar 1900 on the output video data 2010. In accordance with the embodiment, if the user logs in with the specific user account, the controller 1330 may execute the most favorite application of the specific user, and may also display the menu bar 1900 on the executed screen image.

The remaining description is similar to those of FIG. 19, and as such a detailed description thereof will herein be omitted for convenience of description.

Although the embodiment in which the multimedia device logs in with the specific user account has been disclosed for illustrative purposes only, the following embodiments shown in FIGS. 21 to 34 may premise that the multimedia device logs in with the specific user account or may premise that the multimedia device does not log in with the specific user account.

Figure 21:
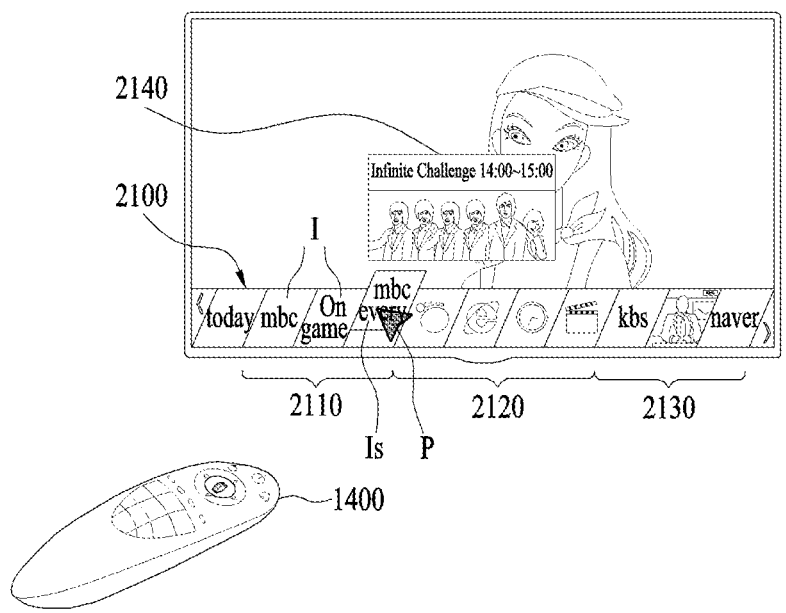
FIG. 21 is a conceptual diagram illustrating a method for outputting additional information using a menu bar displayed on a display unit of the multimedia device according to an embodiment of the present invention.

FIG. 21 is a conceptual diagram illustrating a method for outputting additional information using a menu bar displayed on a display unit of the multimedia device according to an embodiment of the present invention. The same contents as those of FIGS. 19 and 20 will herein be omitted for convenience of description, and the example of FIG. 21 will hereinafter be described centering on the difference between FIG. 19 and FIG. 20.

If the multimedia device logs in with the specific user account or receives a predetermined signal for calling the menu bar from the remote controller 1400, the menu bar 2100 may be displayed on the display unit 1320.

If the multimedia device logs in with the specific user account, the menu bar 2100 may be associated with a channel designated as a preferred channel decided by the specific user, a channel having a history indicating that the specific user views the channel for a predetermined time or longer, an application having a history indicating that the application is executed at least a predetermined number of times by the specific user, a content recommended to the specific user, an application recommended to the specific user, and a channel recommended to the specific user. In addition, if the multimedia device does not log in with the specific user account, the menu bar 2100 may be associated with a channel designated as a preferred channel decided by a general user, a channel having a history indicating that the general user views the channel for a predetermined time or longer, an application having a history indicating that the application is executed at least a predetermined number of times by the general user, a content recommended to the general user, an application recommended to the general user, and a channel recommended to the general user. In accordance with the embodiment, the specific user and the general user are not distinguished from each other, and each of the specific user and the general user will hereinafter be referred to as the term "user" for convenience of description.

The menu bar 2100 may include icons (I) corresponding to respective channels, respective contents, and respective applications. For example, the menu bar 2100 may include any one of a first region 2110, a second region 2120, and a third region 2130. The first region 2110 may include icons (I) corresponding to at least one of a channel corresponding to a preferred channel decided by a user and a channel having a history indicating that the user views the channel for a predetermined time or longer. The second region 2120 may include icons (I) corresponding to applications having a history indicating that the user executes the application at least a predetermined number of times. The third region 2130 may include icons (I) corresponding to at least one of the application recommended to the user and a channel recommended to the user.

If a pointer P corresponding to the movement of the remote controller 1400 is located at the icon ($I_S$) corresponding to a specific channel from among the icons (I) contained in the menu bar 2100, information 2140 regarding the specific channel may be displayed on the display unit 1320. In this case, in order to discriminate between the icon ($I_S$) of the pointer P and the other icons (I) contained in the menu bar 2100, another reference number ($I_S$) will hereinafter be used.

For example, if the pointer P corresponding to the movement of the remote controller 1400 is located at the icon ($I_S$) corresponding to the specific channel, the controller 1330 may output information 2140 regarding a current broadcast program of the specific channel to the display unit 1320. The information 2140 may include at least one of the number of the specific channel, the name and broadcast time of the program, and a representative image of the program.

For example, if the pointer P corresponding to the movement of the remote controller 1400 is located at the icon ($I_S$) corresponding to the specific channel, the controller 1330 may control the receiver 1310 to request metadata of a current broadcast program of the specific channel from the server, and may output the above information 2140 to the display unit 1320 on the basis of metadata transmitted from the server to the receiver 1310.

In another example, the controller 1330 may transmit information regarding all channels capable of being tuned to by the receiver 1310 to the server through the receiver 1310, may control the receiver 1310 to receive metadata of each program being broadcast through all channels from the server, may extract metadata regarding a current broadcast program of the specific channel from the metadata of each received program, and may output the above information 2140 to the display unit 1320 on the basis of the extracted metadata.

In another example, if the receiver 1310 includes two tuners, the controller 1330 may control the second tuner contained in the receiver 1310 to tune to the specific channel, and may also output the above information 2140 to the display unit 1320 on the basis of metadata of the program contained in the broadcast signal received from the tuned specific channel.

The above-mentioned information 2140 may be displayed adjacent to the icon ($I_S$) at which the pointer P of the remote controller 1400 from among the icons (I) contained in the menu bar 2100 is located.

In accordance with the embodiment, the icon ($I_S$) at which the pointer P of the remote controller 1400 is located may be displayed to protrude more than other icons (I) contained in the menu bar 2100.

Figure 22:
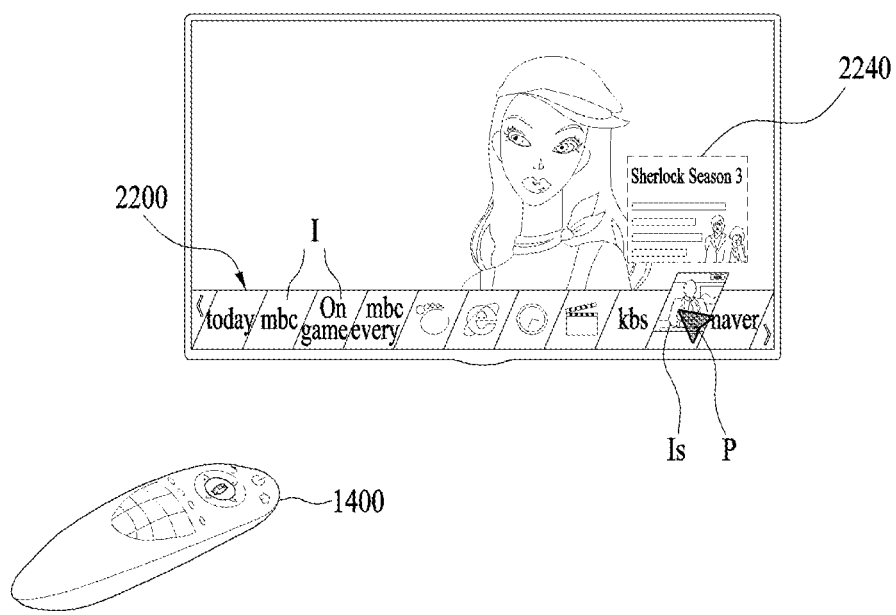
FIG. 22 is a conceptual diagram illustrating another method for outputting additional information using a menu bar displayed on a display unit of the multimedia device according to an embodiment of the present invention.

FIG. 22 is a conceptual diagram illustrating another method for outputting additional information using a menu bar displayed on a display unit of the multimedia device according to an embodiment of the present invention. The same contents as those of FIGS. 19 to 21 will herein be omitted for convenience of description, and the example of FIG. 22 will hereinafter be described centering on the difference between FIG. 22 and FIGS. 19 to 21.

If the multimedia device logs in with the specific user account or if the predetermined signal for calling the menu bar from the remote controller 1400 is received, the controller 1330 may output the menu bar 2200 to the display unit 1320. The menu bar 2200 may be associated with at least one of the channel, content, and application customized for the specific user, and may be associated with at least one of the channel, content, and application for the general user of the multimedia device.

If the pointer P corresponding to the movement of the remote controller 1400 is located at the icon ($I_S$) corresponding to specific content from among the icons (I) contained in the menu bar 2200, the controller 1330 may output information 2240 regarding the specific content to the display unit 1320. In this case, in order to discriminate between the icon ($I_S$) of the pointer P and the other icons (I) contained in the menu bar 2200, another reference number ($I_S$) will hereinafter be used.

For example, the information 2240 may include at least one of the name, season, episode number, synopsis, a representative image of the specific content, and account information of the specific content.

For instance, if the pointer P corresponding to the movement of the remote controller 1400 is located at the icon ($I_S$) corresponding to the specific content, the controller 1330 may control the receiver 1310 to request metadata regarding the specific content from the server, and may output the above information 2240 to the display unit 1320 on the basis of the metadata transmitted from the server to the receiver 1310.

In another example, the controller 1330 may control the receiver 1310 to request metadata of each piece of content related to the icons (I) contained in the menu bar 2200 from the server, may extract metadata of the specific content from the metadata of each received piece of content, and may output the above information 2240 to the display unit 1320 on the basis of the extracted metadata.

In another example, the controller 1330 may control the receiver 1310 to periodically or aperiodically receive metadata of each content capable of being used by the multimedia device from the server, may extract metadata of the specific content from the metadata of each received piece of content, and may output the above information 2240 to the display unit 1320 on the basis of the extracted metadata.

The information 2240 may be displayed adjacent to the icon ($I_S$) at which the pointer P of the remote controller 1400 from among the icons (I) contained in the menu bar 2200 is located.

In accordance with the embodiment, the icon ($I_S$) at which the pointer P of the remote controller 1400 is located may be displayed to protrude more than other icons (I) contained in the menu bar 2200.

Figure 23:
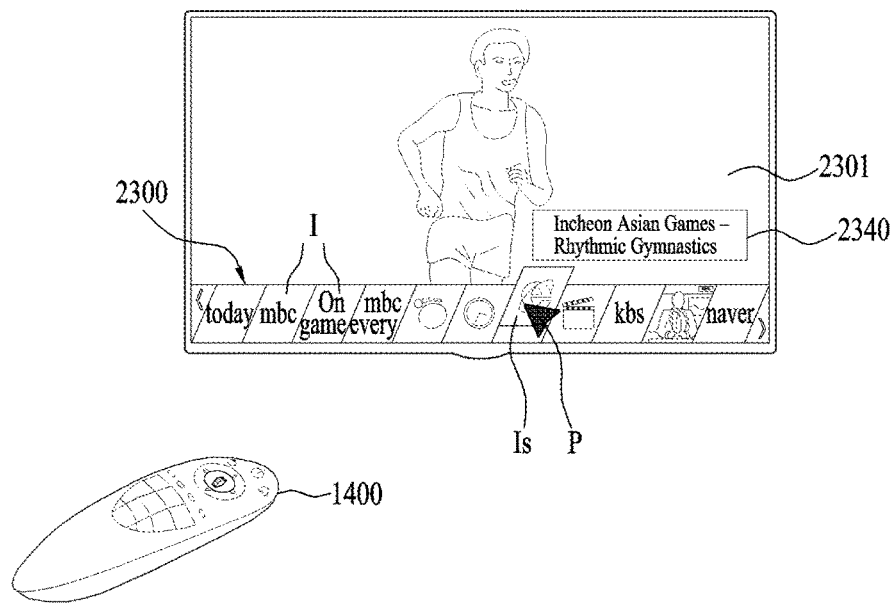
FIG. 23 is a conceptual diagram illustrating another method for outputting additional information using a menu bar displayed on a display unit of the multimedia device according to an embodiment of the present invention.

FIG. 23 is a conceptual diagram illustrating another method for outputting additional information using a menu bar displayed on a display unit of the multimedia device according to an embodiment of the present invention. The same contents as those of FIGS. 19 to 22 will herein be omitted for convenience of description, and the example of FIG. 23 will hereinafter be described centering on the difference between FIG. 23 and FIGS. 19 to 22.

When the multimedia device logs in with the specific user account or when a predetermined signal for calling the menu bar from the remote controller 1400 is received, the controller 1330 may output the menu bar 2300 to the display unit 1320. The menu bar 2300 may be associated with at least one of the channel, content, and application customized for the specific user, and may be associated with at least one of the channel, content, and application for the general user of the multimedia device.

If the pointer P corresponding to the movement of the remote controller 1400 is located at the icon ($I_S$) corresponding to a specific application from among the icons (I) contained in the menu bar 2300, the controller 1330 may output information 2340 associated with the application to the display unit 1320. In this case, in order to discriminate between the icon ($I_S$) of the pointer P and the other icons (I) contained in the menu bar 2300, another reference number ($I_S$) will hereinafter be used.

For example, when video data 2301 corresponding to specific content is displayed on the display unit 1320 and the specific application is a web-based application, the above information 2340 may include the result for searching for the specific content in the web-based application. Alternatively, the information 2340 may include detailed information (e.g., name, usage, etc. of the application) regarding the specific application, irrespective of the specific content.

For example, if the pointer P corresponding to the movement of the remote controller 1400 is located at the icon ($I_S$) corresponding to the specific content, the controller 1330 may search for the specific content in the specific application on the basis of metadata regarding the specific content, and may output the information 2340 including the search result to the display unit 1320.

Figure 24:
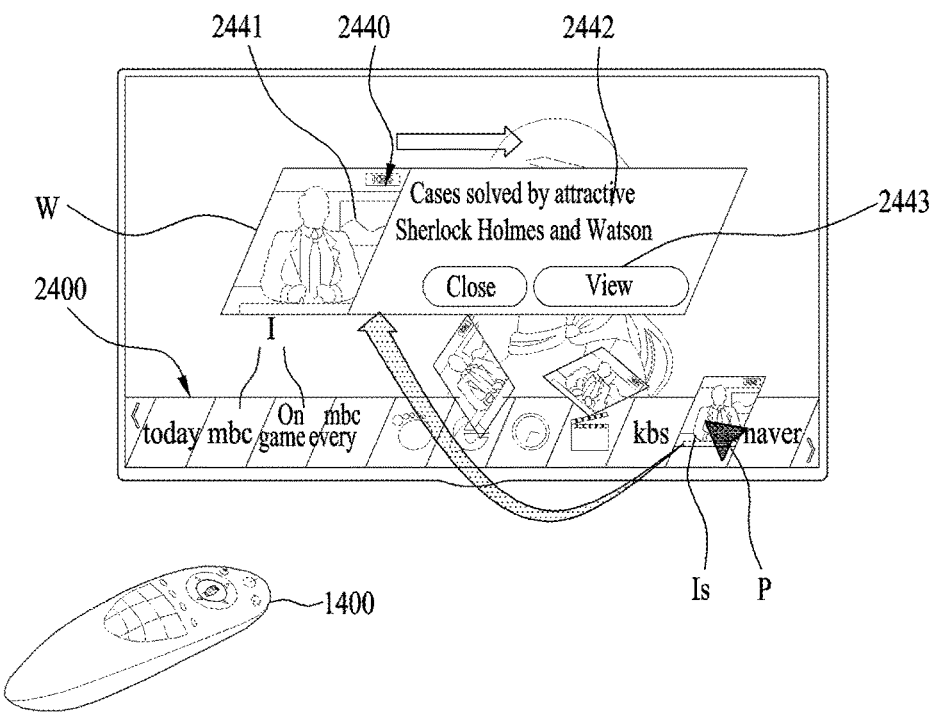
FIG. 24 is a conceptual diagram illustrating another method for outputting additional information using a menu bar displayed on a display unit of the multimedia device according to an embodiment of the present invention.

FIG. 24 is a conceptual diagram illustrating another method for outputting additional information using a menu bar displayed on a display unit of the multimedia device according to an embodiment of the present invention. The same contents as those of FIGS. 19 to 23 will herein be omitted for convenience of description, and the example of FIG. 24 will hereinafter be described centering on the difference between FIG. 24 and FIGS. 19 to 23.

When the multimedia device logs in with the specific user account or when the predetermined signal for calling the menu bar from the remote controller 1400 is received, the controller 1330 may output the menu bar 2400 to the display unit 1320.

The menu bar 2400 may be associated with at least one of the channel, content, and application customized for the specific user, and may be associated with at least one of the channel, content, and application for the general user of the multimedia device.

If the icon ($I_S$) corresponding to specific content from among the icons (I) contained in the menu bar 2200 is selected by the pointer P corresponding to the movement of the remote controller 1400, the controller 1330 may output detailed information 2440 regarding the content to the display unit 1320. In this case, in order to discriminate between the icon ($I_S$) of the pointer P and the other icons (I) contained in the menu bar 2400, another reference number ($I_S$) will hereinafter be used. For example, if the pointer P corresponding to the movement of the remote controller 1400 hovers on the icon ($I_S$) for the predetermined time or longer, the controller 1330 may output detailed information 2440 regarding the specific content to the display unit 1320. Compared to the embodiment of FIG. 22, if the pointer P corresponding to the movement of the remote controller 1400 is located at the icon ($I_S$), the controller 1330 may immediately output brief information regarding the specific content to the display unit 1320. If the pointer P corresponding to the movement of the remote controller 1400 hovers on the icon ($I_S$) for a predetermined time or longer, the controller 1330 may output detailed information regarding the specific content to the display unit 1320.

In accordance with the embodiment, the detailed information 2440 may include a first region 2441 including a representative image of the specific content and a second image 2442 including detailed description of the specific content. The second region may include at least one of the name, season, episode number, synopsis, account information of the specific content, and a menu 2443 for viewing the specific content.

In accordance with the embodiment, the first region 2441 may first be displayed on the display unit 1320, and the second region 2442 may be displayed to protrude from the first region 2441.

In accordance with the embodiment, when the detailed information 2440 is output to the display unit 1320, it may be possible to use the animation effect in which the same image as the icon ($I_S$) corresponding to the specific content flies to the first region 2441.

In accordance with the embodiment, the window (W) including the detailed information 2440 may be identical in shape to the icon ($I_S$) corresponding to the specific content, and may be different in size from the icon ($I_S$) corresponding to the specific content.

In accordance with the embodiment, each of the first region 2441 and the second region 2442 may be identical in shape to the icon ($I_S$) corresponding to the specific content, and may be different in size from the icon ($I_S$) corresponding to the specific content. Although the embodiment has been disclosed using the specific content as an example, the embodiment can also be applied to the case in which the pointer P hovers on the icon corresponding to a specific channel or a specific application for a predetermined time or longer.

Figure 25:
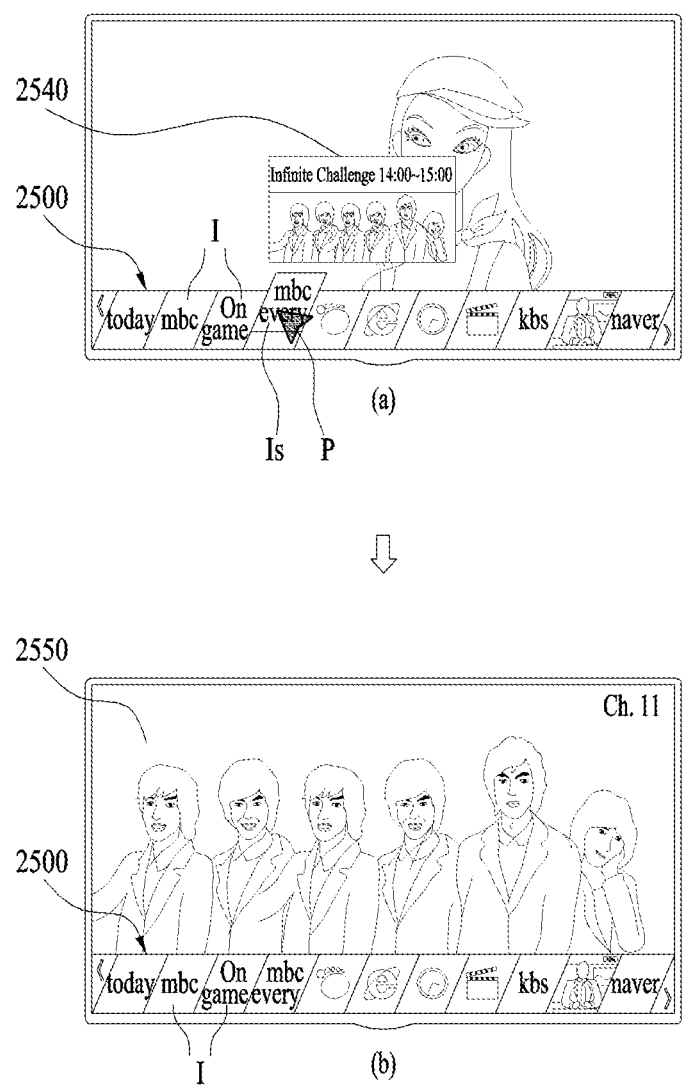
FIG. 25 is a conceptual diagram illustrating another method for outputting additional information using a menu bar displayed on a display unit of the multimedia device according to an embodiment of the present invention.

FIG. 25 is a conceptual diagram illustrating another method for outputting additional information using a menu bar displayed on a display unit of the multimedia device according to an embodiment of the present invention. The same contents as those of FIGS. 19 to 24 will herein be omitted for convenience of description, and the example of FIG. 25 will hereinafter be described centering on the difference between FIG. 25 and FIGS. 19 to 24.

When the multimedia device logs in with a specific user account or when the predetermined signal for calling the menu bar from the remote controller 1400 is received, the controller 1330 may output the menu bar 2500 to the display unit 1320. The menu bar 2500 may be associated with at least one of the channel, content, and application customized for the specific user, and may be associated with at least one of the channel, content, and application for the general user of the multimedia device.

Referring to FIG. 25(a), if the pointer P corresponding to the movement of the remote controller 1400 is located at the icon ($I_S$) corresponding to a specific channel from among the icons (I) contained in the menu bar 2500, the controller 1330 may output information 2540 regarding the specific channel to the display unit 1320. In this case, in order to discriminate between the icon ($I_S$) of the pointer P and the other icons (I) contained in the menu bar 2500, another reference number ($I_S$) will hereinafter be used. The information 2540 is similar to the above information 2140 of FIG. 21, and as such a detailed description thereof will herein be omitted for convenience of description.

Under the condition that the pointer P corresponding to the movement of the remote controller 1400 is located at the icon ($I_S$) corresponding to the specific channel, if the controller 1330 receives the signal corresponding to a specific key contained in the remote controller 1400, the controller 1330 switches a current channel to the specific channel as shown in FIG. 25(b), controls the receiver 1310 to receive a broadcast signal regarding the specific channel, processes video data 2550 contained in the received broadcast signal, and outputs the processed video data 2550 to the display unit 1320.

The user locates the pointer of the remote controller 1400 on a certain icon (I) contained in the menu bar 2500, such that the user can confirm information regarding the channel, content, or application corresponding to the icon (I). The user presses the confirmation button of the remote controller 1400 on the condition that the pointer of the remote controller 1400 is located at the icon (I) contained in the menu bar 2500, such that the channel, content, or application corresponding to the icon (I) can be executed.

Figure 26:
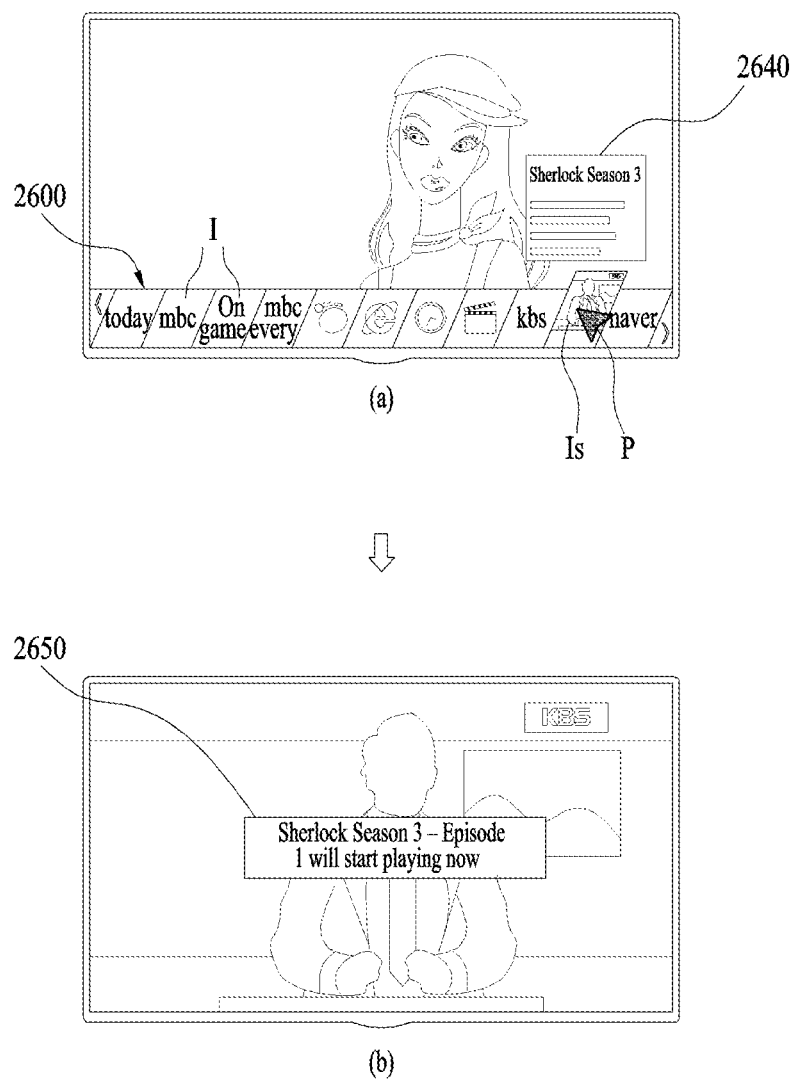
FIG. 26 is a conceptual diagram illustrating another method for outputting additional information using a menu bar displayed on a display unit of the multimedia device according to an embodiment of the present invention.

FIG. 26 is a conceptual diagram illustrating another method for outputting additional information using a menu bar displayed on a display unit of the multimedia device according to an embodiment of the present invention. The same contents as those of FIGS. 19 to 25 will herein be omitted for convenience of description, and the example of FIG. 26 will hereinafter be described centering on the difference between FIG. 26 and FIGS. 19 to 25.

When the multimedia device logs in with a specific user account or receives a predetermined signal for calling the menu bar from the remote controller 1400, the controller 1330 may output the menu bar 2600 to the display unit 1320. The menu bar 2600 may be associated with at least one of the channel, content, and application customized for the specific user, and may be associated with at least one of the channel, content, and application for the general user of the multimedia device.

Referring to FIG. 26(a), if the pointer P corresponding to the movement of the remote controller 1400 is located at the icon ($I_S$) corresponding to a specific channel from among the icons (I) contained in the menu bar 2600, the controller 1330 may output channel information 2640 regarding the specific channel to the display unit 1320. In this case, in order to discriminate between the icon ($I_S$) of the pointer P and the other icons (I) contained in the menu bar 2600, another reference number ($I_S$) will hereinafter be used. The information 2640 is similar to the above information 2440 of FIG. 22, and as such a detailed description thereof will herein be omitted for convenience of description.

Under the condition that the pointer P corresponding to the movement of the remote controller 1400 is located at the icon ($I_S$) corresponding to the specific content, if the controller 1330 receives the signal corresponding to a specific key contained in the remote controller 1400, the controller 1330 may output a message 2650 indicating execution (playback) of the specific content to the display unit 1320. The controller 1330 may output video data corresponding to the specific content to the display unit 1320.

In more detail, under the condition that the pointer P corresponding to the movement of the remote controller 1400 is located at the icon ($I_S$) corresponding to the specific content, if the controller 1330 receives the signal corresponding to a specific key contained in the remote controller 1400, the controller 1330 transmits a signal for requesting the specific content to the server and controls the receiver 1310 to receive the requested specific content from the server. The controller 1330 may process video data contained in the received specific content, and may output the processed video data to the display unit 1320.

Figure 27:
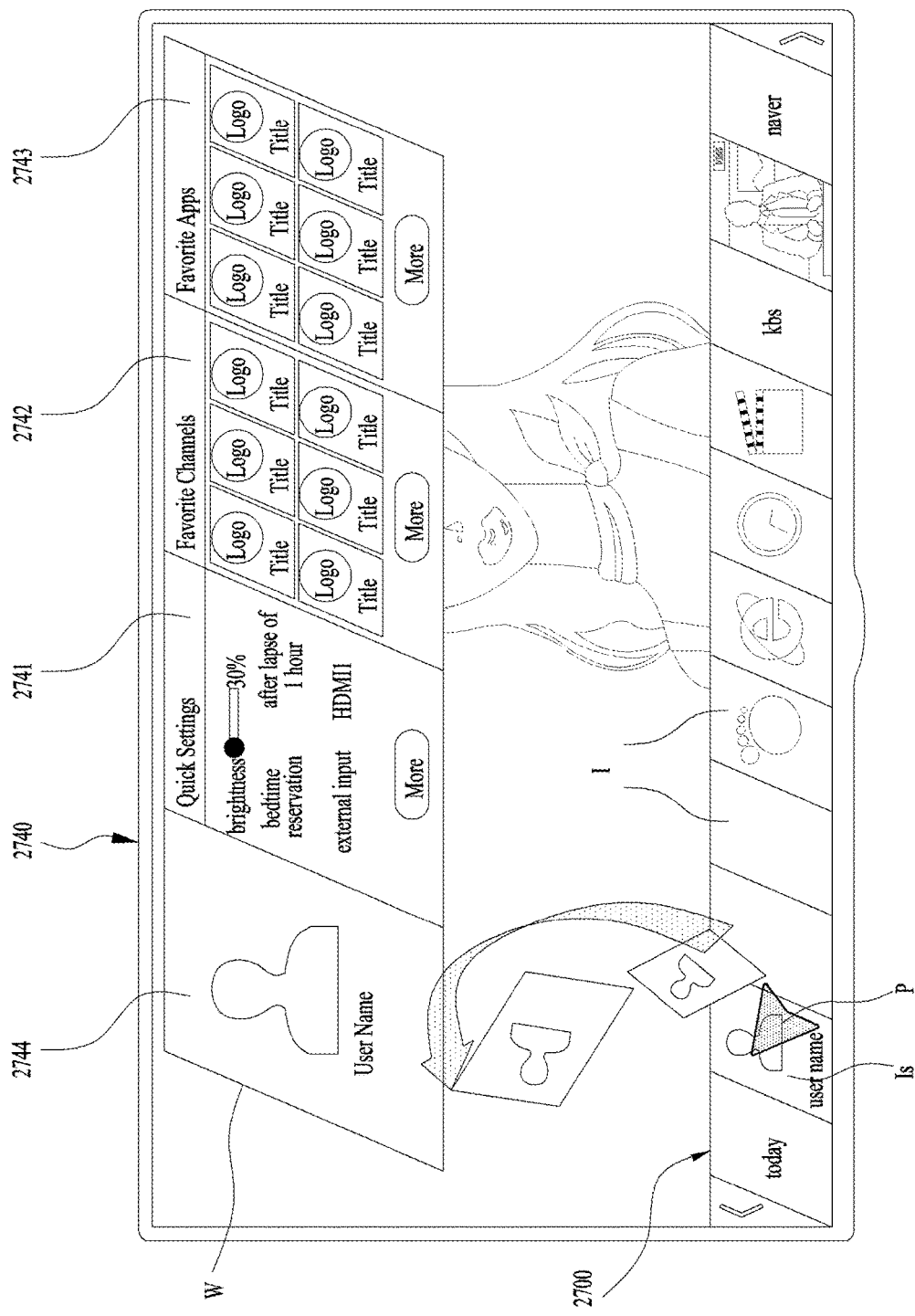
FIG. 27 is a conceptual diagram illustrating another method for outputting additional information using a menu bar displayed on a display unit of the multimedia device according to an embodiment of the present invention.

FIG. 27 is a conceptual diagram illustrating another method for outputting additional information using a menu bar displayed on a display unit of the multimedia device according to an embodiment of the present invention. The same contents as those of FIGS. 19 to 26 will herein be omitted for convenience of description, and the example of FIG. 27 will hereinafter be described centering on the difference between FIG. 27 and FIGS. 19 to 26.

If the multimedia device logs in with a specific user account or receives a predetermined signal for calling the menu bar from the remote controller 1400, the controller 1330 may output the menu bar 2700 to the display unit 1320. The menu bar 2700 may be associated with at least one of the channel, content, and application customized for the specific user, and may be associated with at least one of the channel, content, and application for the general user of the multimedia device.

The menu bar 2700 may include a plurality of icons related to at least one of a channel designated as a preferred channel, a channel having a history indicating that a user views the channel for a predetermined time or longer, an application having a history indicating that the application is executed at least a predetermined number of times, recommended content, a recommended application, and a recommended channel. In addition, the menu bar 2700 may include the icon corresponding to the specific user.

The menu bar 2700 may include the icon ($I_S$) corresponding to the first user, as the icon corresponding to the specific user. The first user may be a user corresponding to the login account of a current multimedia device, may be a registration user registered in the memory 1350 as the user of the multimedia device, or may be a general user of the multimedia device instead of the specific user. For convenience of description, the embodiment may assume that the first user is a user corresponding to the login account of the current multimedia device. In this case, in order to discriminate between the icon ($I_S$) corresponding to the first user and the other icons (I) contained in the menu bar 2700, another reference number ($I_S$) will hereinafter be used.

In accordance with the embodiment, the icon ($I_S$) corresponding to the first user may be generated in the menu bar 2700 only when the multimedia device logs in with the account of the first user, and may be generated in the menu bar 2700 irrespective of the login state based on the account of the first user. If the multimedia device logs in with the account of the first user, the position of the icon ($I_S$) may be changed in the menu bar 2700. If the multimedia device logs in with the account of the first user, the icon ($I_S$) may be located to have higher priority over other icons ($I_S$) within the menu bar 2700. In this case, the above-mentioned state in which the icon ($I_S$) corresponding to the first user is located to have higher priority than other icons (I) may indicate that the icon ($I_S$) corresponding to the first user is located at the left side in the menu bar 2700 as compared to the position of the other icons (I). If the icon ($I_S$) corresponding to the first user from among the icons (I) contained in the menu bar 2700 is selected by the pointer P corresponding to the movement of the remote controller 1400, the controller 1330 may output a GUI 2740 related to a specific function from among functions of the multimedia device to the display unit 1320 on the basis of the history obtained when the first user uses the multimedia device. For example, when the pointer P corresponding to the movement of the remote controller 1400 is located at the icon ($I_S$), and when the pointer P corresponding to the movement of the remote controller 1400 hovers on the icon ($I_S$) for a predetermined time or longer, if the controller 1330 receives a signal corresponding to the specific key of the remote controller 1400 on the condition that the pointer P corresponding to the movement of the remote controller 1400 is located at the icon ($I_S$), the controller 1330 may output the GUI 2740 to the display unit 1320.

The GUI 2740 may include at least one of a first menu region 2741, a second menu region 2742, a third menu region 2743, and a fourth menu region (not shown). The first menu region 2741 may be associated with a setting value selected by the first user at least a predetermined number of times from among a plurality of setting values for establishing the environment of the multimedia device. The second menu region 2742 may be associated with an application used at least a predetermined number of times by the first user from among applications capable of being used through the multimedia device. The third menu region 2743 may be associated with a channel viewed by the first user at least a predetermined number of times from among channels capable of being viewed through the multimedia device. The fourth menu region (not shown) may be associated with content used by the first user at least a predetermined number of times from among contents capable of being used through the multimedia device. For example, the setting values for establishing the environment of the multimedia device may indicate a setting value related to brightness of the display unit 1320, a setting value for establishing bedtime reservation, a setting value related to an external input port, a setting value related to a handwriting style, font, etc. displayed on the display unit 1320.

Through the first GUI 2740, the first user may confirm the setting value for establishing the environment frequently used by the first user, may quickly change the setting value for establishing the environment, may confirm the channel/application/content frequently used by the first user, or may select the preferred channel/application/content.

In accordance with the embodiment, the GUI 2740 may further include a fifth region 2744 including the same image as the icon ($I_S$) corresponding to the first user.

In accordance with the embodiment, the fifth region 2744 including the same image as the icon ($I_S$) corresponding to the first user may first be displayed on the display unit 1320, and the GUI 2740 may also be displayed in a manner that the remaining regions contained in the GUI 2740 protrude from the fifth region 2744.

In accordance with the embodiment, when the GUI 2740 is displayed on the display unit 1320, it may be possible to use the animation effect in which the same image as the icon ($I_S$) corresponding to the first user flies to the fifth region 2744.

In accordance with the embodiment, the window W including the GUI 2740 may be identical in shape to the icon ($I_S$) corresponding to the first user, and may be different in size from the icon ($I_S$) corresponding to the first user.

In accordance with the embodiment, each region contained in the GUI 2740 may be identical in shape to the icon ($I_S$) corresponding to the first user, and may be different in size from the icon ($I_S$) corresponding to the first user.

Figure 28:
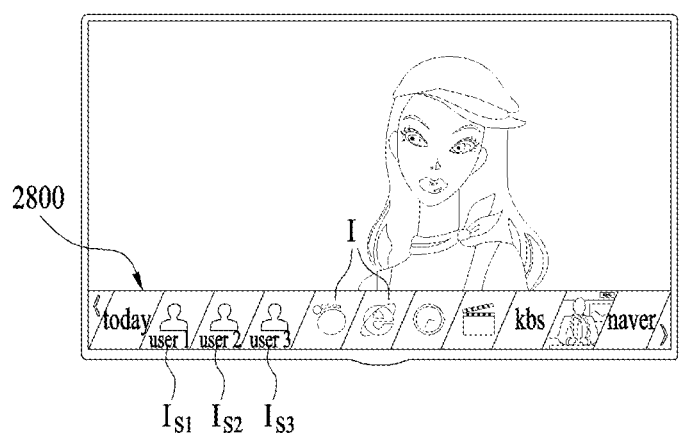
FIG. 28 is a conceptual diagram illustrating another method for outputting additional information using a menu bar displayed on a display unit of the multimedia device according to an embodiment of the present invention.

FIG. 28 is a conceptual diagram illustrating another method for outputting additional information using a menu bar displayed on a display unit of the multimedia device according to an embodiment of the present invention. The same contents as those of FIGS. 19 to 27 will herein be omitted for convenience of description, and the example of FIG. 28 will hereinafter be described centering on the difference between FIG. 28 and FIGS. 19 to 27.

When the multimedia device logs in with a specific user account or when the controller 1330 receives a predetermined signal for calling the menu bar from the remote controller 1400, the controller 1330 may display the menu bar 2700 on the display unit 1320. The menu bar 2800 may be associated with at least one of the channel, content, and application customized for the specific user, and may be associated with at least one of the channel, content, and application for the general user of the multimedia device.

The menu bar 2800 may include icons corresponding to respective users. For example, the menu bar 2800 may include the icon ($I_{S1}$) corresponding to the first user, the icon ($I_{S2}$) corresponding to the second user, and the icon ($I_{S3}$) corresponding to the third user. Any one of the first user, the second user, and the third user may be a user corresponding to the login account of the current multimedia device, or the first user corresponding to the leftmost icon ($I_{S1}$) of the menu bar 2800 from among the icons ($I_{S1}$, $I_{S2}$, $I_{S3}$) may be a user corresponding to the login account of the current multimedia device. In addition, the first user, the second user, and the third user may be registered in the memory 1350 as the users of the multimedia device. In accordance with the embodiment, if the multimedia device logs in with the account of any one (e.g., the first user) of the first user, the second user, and the third user, the icon ($I_{S1}$) corresponding to the first user may be highlighted in the menu bar 2800, the position of the icon ($I_{S1}$) may be changed in the menu bar 2800, and the icon ($I_{S1}$) may be located to have higher priority than other icons (I) in the menu bar 2800. In this case, in order to distinguish each of the icon ($I_{S1}$) of the first user, the icon ($I_{S2}$) of the second user, and the icon ($I_{S3}$) of the third user from the other icons (I) contained in the menu bar 2800, other reference numbers ($I_{S1}$, $I_{S2}$, $I_{S3}$) will hereinafter be used.

If the icon ($I_{S1}$) corresponding to the first user from among the icons (I) contained in the menu bar 2800 is selected by the pointer P corresponding to the movement of the remote controller 1400, the controller 1300 may output the GUI associated with a specific function from among the functions of the multimedia device to the display unit 1320 on the basis of the history indicating that the first user uses the multimedia device. If the icon ($I_{S2}$) corresponding to the second user is selected, the controller may output the GUI related to a specific function from among the functions of the multimedia device to the display unit 1320 on the basis of the history indicating that the second user uses the multimedia device. If the icon ($I_{S3}$) corresponding to the third user is selected, the GUI related to a specific function from among the functions of the multimedia device may be displayed on the display unit 1320 on the basis of the history indicating that the third user uses the multimedia device.

Contents of the GUI displayed when each of the icon ($I_{S1}$) corresponding to the first user, the icon ($I_2$) corresponding to the second user, and the icon ($I_{S3}$) corresponding to the third user is selected by the remote controller 1400 are similar to those of FIG. 27, and as such a detailed description thereof will herein be omitted for convenience of description.

Figure 29:
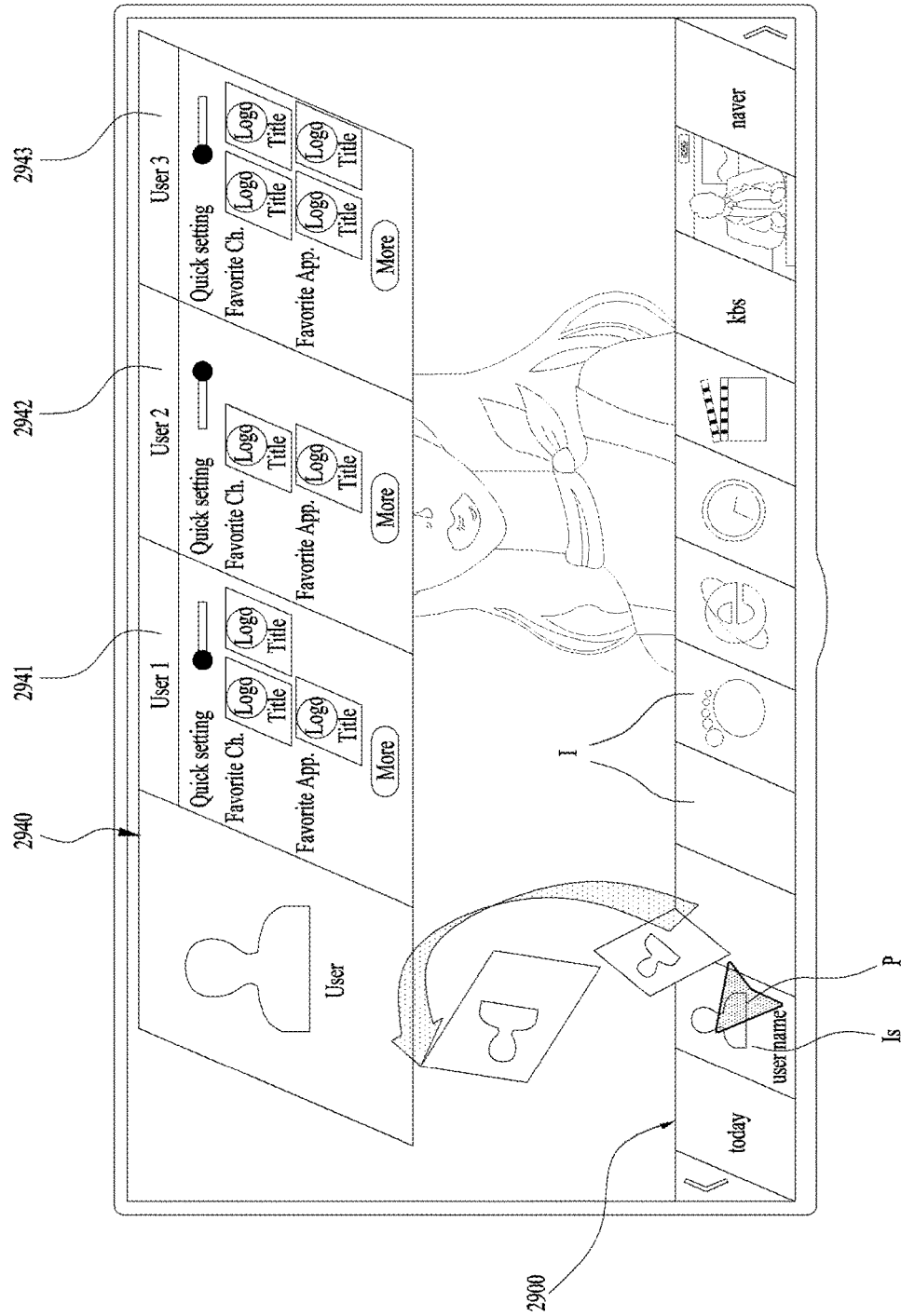
FIG. 29 is a conceptual diagram illustrating another method for outputting additional information using a menu bar displayed on a display unit of the multimedia device according to an embodiment of the present invention.

FIG. 29 is a conceptual diagram illustrating another method for outputting additional information using a menu bar displayed on a display unit of the multimedia device according to an embodiment of the present invention. The same contents as those of FIGS. 19 to 28 will herein be omitted for convenience of description, and the example of FIG. 29 will hereinafter be described centering on the differences between FIG. 29 and FIGS. 19 to 28.

When the multimedia device logs in with a specific user account or when the controller 1330 receives a predetermined signal for calling the menu bar from the remote controller 1400, the controller 1330 may display the menu bar 2900 on the display unit 1320. The menu bar 2900 may be associated with at least one of the channel, content, and application customized for the specific user, and may be associated with at least one of the channel, content, and application for the general user of the multimedia device.

The menu bar 2900 may include the icon ($I_S$) corresponding to the user. The user may be associated with at least one of the users registered in the memory 1350 as the user of the multimedia device. In this case, in order to discriminate between the icon ($I_S$) of the user and the other icons (I) contained in the menu bar 2900, another reference number ($I_S$) will hereinafter be used.

If the icon ($I_S$) corresponding to the user from among the icons (I) contained in the menu bar 2900 is selected by the pointer P corresponding to the movement of the remote controller 1400, the controller 1330 may output the GUI 2940 related to a specific function from among the functions of the multimedia device to the display unit 1320 on the basis of the history indicating that each of the users registered in the memory 1350 uses the multimedia device. For example, assuming that three users are registered in the memory 1350, the GUI 2940 may include a first region 2941 corresponding to the first registered user, a second region 2942 corresponding to the second registered user, and a third region 2943 corresponding to the third registered user.

Each of the first region 2941, the second region 2942, and the third region 2943 contained in the GUI 2940 may include at least one of a first menu associated with the setting value selected by each registered user at least the predetermined number of times from among the setting values for establishing the environment of the multimedia device, a second menu associated with the application used by each registered user at least the predetermined number of times from among the applications capable of being used through the multimedia device, a third menu associated with the channel viewed by each registered user for the predetermined time or longer from among the channels capable of being viewed through the multimedia device, and a fourth menu associated with content used by each registered user at least the predetermined number of times from among the contents capable of being used through the multimedia device.

The contents related to the GUI 2940 are similar to those of FIG. 27, and as such a detailed description thereof will herein be omitted for convenience of description.

Meanwhile, according to the embodiment of the present invention, the controller 1330 may also construct the menu bar on the basis of the screen image displayed on the display unit 1320, and a detailed description thereof will hereinafter be described with reference to FIGS. 30 to 32.

Figure 30:
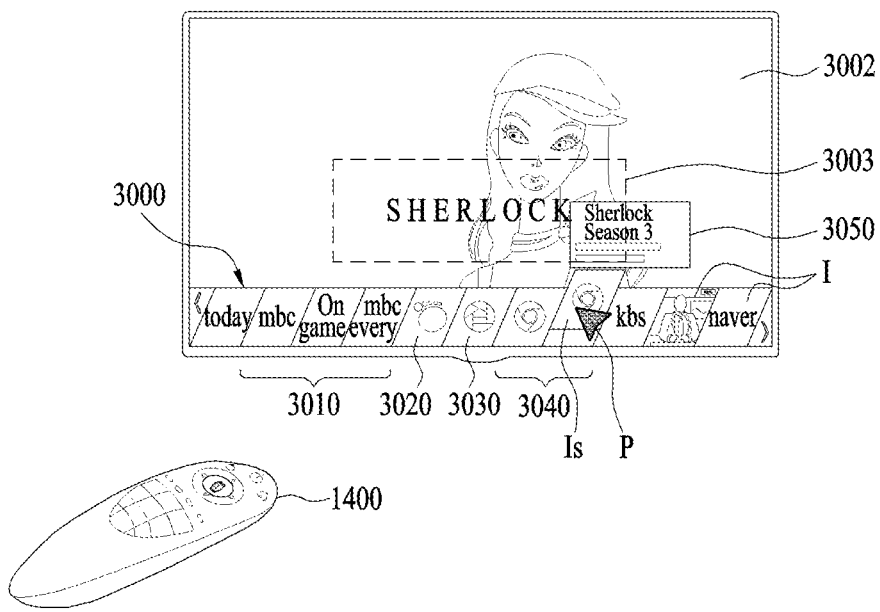
FIG. 30 is a conceptual diagram illustrating one exemplary method for changing the structure of a menu bar according to a screen of the display unit for use in the multimedia device according to an embodiment of the present invention.

FIG. 30 is a conceptual diagram illustrating one exemplary method for changing the structure of a menu bar according to a screen of the display unit for use in the multimedia device according to an embodiment of the present invention. The same contents as those of FIGS. 19 to 29 will herein be omitted for convenience of description, and the example of FIG. 30 will hereinafter be described centering on the difference between FIG. 30 and FIGS. 19 to 29.

When the multimedia device logs in with a specific user account or when the controller 1330 receives a predetermined signal for calling the menu bar from the remote controller 1400, the controller 1330 may display the menu bar 3000 on the display unit 1320. In this case, the controller 1330 may construct a menu contained in the menu bar 3000 on the basis of the screen image 3002 displayed on the display unit 1320.

For example, the controller 1330 may construct the menu bar 3000 using at least one of a channel, application, and content associated with the specific content, from among channels capable of being viewed through the multimedia device, applications capable of being used through the multimedia device, and contents capable of being used through the multimedia device, on the basis of metadata (including a broadcast program) associated with video data displayed on the display unit 1320.

In another example, the controller 1330 may recognize an object contained in the screen image (i.e., video data displayed on the display unit 1320) displayed on the display unit 1320, may detect object information on the basis of the recognized object, and may construct the menu bar 3000 on the basis of the detected object information. In this case, the object may include any one of a letter, a figure, and a numeral. The term "object recognition" and "detection of object information" may indicate that an object contained in an image, graphic data, and video data is recognized and then converted into suitable text data. The controller 1330 may capture the screen image 3002, recognize the object 3003 contained in the captured screen image, and detect object information (e.g., Sherlock) on the basis of the recognized object, such that the controller 1330 may construct the menu bar 3000 using at least one of a channel, application, and content associated with the detected object information from among channels capable of being viewed through the multimedia device, applications capable of being used through the multimedia device, and contents capable of being used through the multimedia device.

For example, if a title of the specific content is contained in the detected object information, the menu bar 3000 may include at least one of a first region 3010, a second region 3020, a third region 3030, and a fourth region 3040. The first region 3010 may be associated with content having the same title as that of the specific content, and also be associated with a channel for broadcasting another season of the specific content and another episode of the specific content. The second region 3020 may be associated with content having the same title as that of the specific content from among contents capable of being used through the multimedia device, and also be associated with the application for allowing a user to view another season of the specific content and another episode of the specific content. The third region 3030 may be associated with the application for allowing the user to check the image related to the specific content. The fourth region 3040 may be associated with the result for searching for synopsis- and character-information of the specific content in the web browser application.

If the pointer P corresponding to the movement of the remote controller 1400 is located at the specific icon ($I_S$) from among the icons (I) contained in the menu bar 3000, the controller 1330 may output information 3050 regarding the specific icon ($I_S$) to the display unit 1320. For example, if the specific icon ($I_S$) is associated with the result for searching for character information of the specific content in the web browser application, the information 3050 may include specific information indicating that the specific icon ($I_S$) is the web browser application corresponding to the search result of character information of the specific content.

Figure 31:
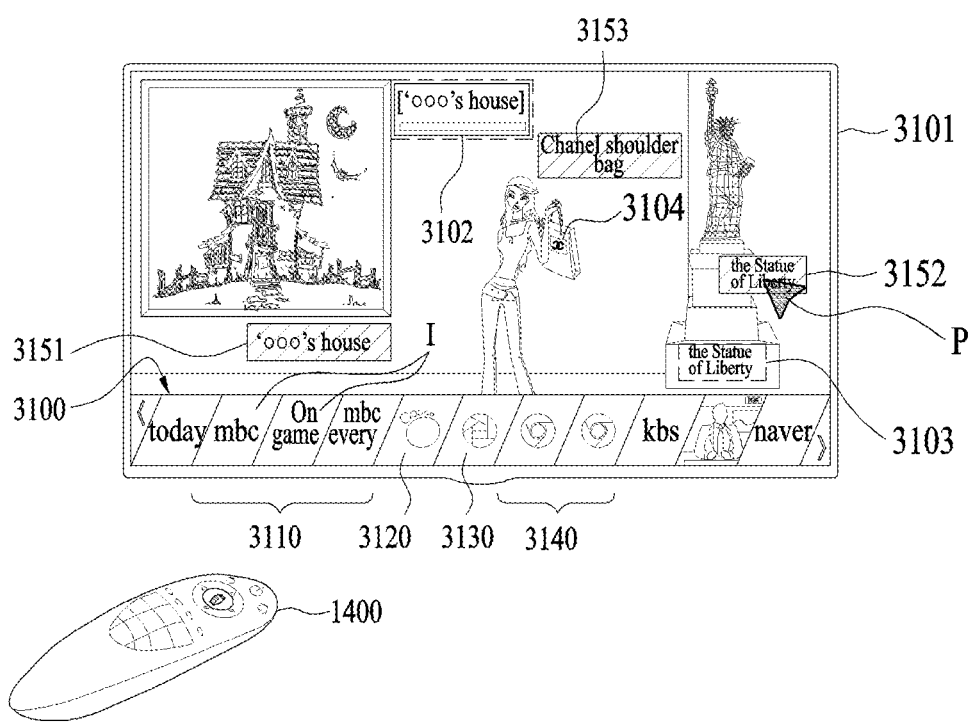
FIG. 31 is a conceptual diagram illustrating an exemplary case in which a specific function of the multimedia device is activated according to an embodiment of the present invention.

FIG. 31 is a conceptual diagram illustrating an exemplary case in which a specific function of the multimedia device is activated according to an embodiment of the present invention. The same contents as those of FIGS. 19 to 30 will herein be omitted for convenience of description, and the example of FIG. 31 will hereinafter be described centering on the difference between FIG. 31 and FIGS. 19 to 30. In accordance with the embodiment, the specific function may indicate the function for recognizing an object contained in the screen image displayed on the display unit 1320. For convenience of description, this embodiment may assume that the specific function is an Optical Character Recognition (OCR) function.

If the command for activating the OCR function is detected, the controller 1330 may recognize an object contained in the screen image displayed on the display unit 1320, may detect object information on the basis of the recognized object, and may output the detected object to the display unit 1320. In this case, the object may include any one of a letter, a figure, and a numeral. The term "object recognition" and "detection of object information" may indicate that an object contained in an image, graphic data, and video data is recognized and then converted into suitable text data. For example, the controller 1330 may capture the screen image 3101 corresponding to the specific content displayed on the display unit 1320 at intervals of a predetermined time, may recognize the objects (3102, 3103, 3014) contained in the captured screen image, may detect object information (e.g., "oo's house", the Statue of Liberty, . . . specific figures, etc.) on the basis of the recognized object, and may output graphic data (3151, 3152, 3153) associated with the detected object information to the display unit 1320.

If the controller 1330 receives a predetermined signal for calling the menu bar from the remote controller 1400, the controller 1330 may display the menu bar 3100 on the display unit 1320. In this case, the controller 1330 may construct the menu bar 3100 using at least one of a channel, application, and content associated with the detected object information, from among channels capable of being viewed through the multimedia device, applications capable of being used through the multimedia device, and contents capable of being used through the multimedia device, on the basis of the detected object information.

For example, the menu bar 3100 may include at least one of a first region 3110, a second region 3120, a third region 3130, and a fourth region 3140. The first region 3110 may be associated with a channel for broadcasting a program related to the detected object information. The second region 3120 may be associated with the application for allowing the user to view content related to the detected object information. The third region 1330 may be associated with the application for allowing the user to confirm the image related to the detected object information. The fourth region 1340 may be associated with the result for searching for the detected object information in the web browser application.

In accordance with the embodiment, if the OCR function is executed on the condition that the menu bar 3100 is first displayed, the menu bar 3100 formed before execution of the OCR function may also be different in shape from the menu bar 3100 formed after execution of the OCR function.

The user may also select any one of the graphic data (3151, 3152, 3153) using the pointer P corresponding to the movement of the remote controller 1400, and a detailed description thereof will hereinafter be given with reference to FIG. 32.

Figure 32:
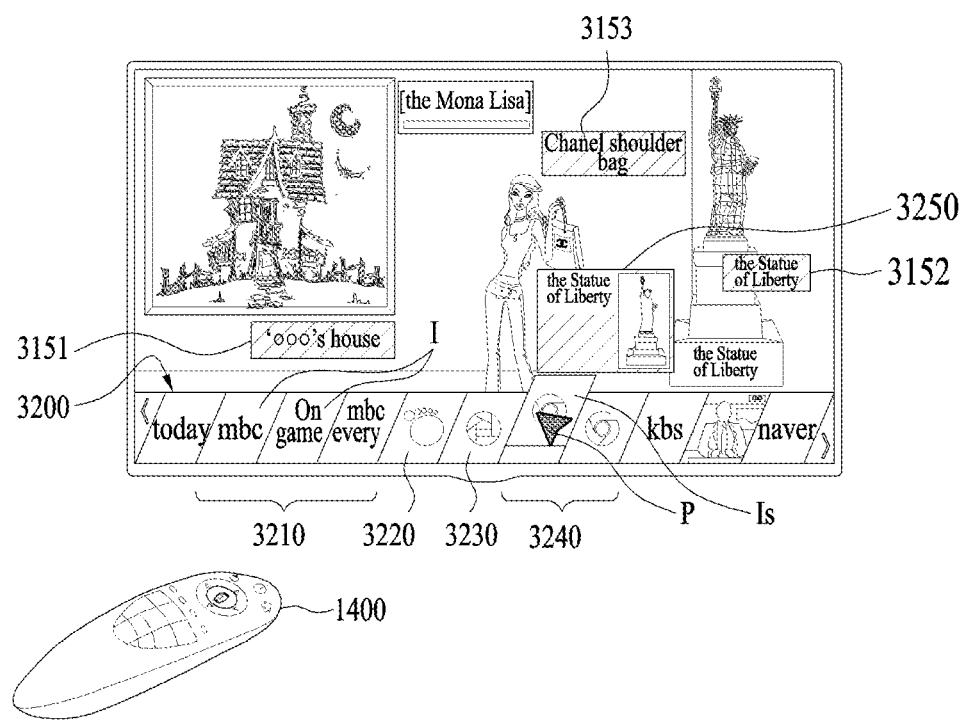
FIG. 32 is a conceptual diagram illustrating an exemplary case in which graphic data displayed on the display unit is selected using a remote controller shown in the embodiment of FIG. 31.

FIG. 32 is a conceptual diagram illustrating an exemplary case in which graphic data displayed on the display unit is selected using a remote controller shown in the embodiment of FIG. 31. For convenience of description, this embodiment of FIG. 32 may assume that graphic data 3152 corresponding to the Statue of Liberty from among the above graphic data (3151, 3152, 3153) shown in FIG. 31 is selected by the remote controller 1400, If the pointer P of the remote controller 1400 is located at the graphic data 3152 corresponding to "Venus of Milo" from among the graphic data (3151, 3152, 3153) displayed on the display unit 1320, the controller 1330 of the multimedia device may construct the menu bar 3200 on the basis of object information (i.e., the Statue of Liberty) corresponding to the graphic data 3152. In accordance with the embodiment, in order to discriminate between the menu bar 3200 and the menu bar 3100 formed before the graphic data 3152 is selected by the remote controller 1400, another reference number 3200 will hereinafter be used for convenience of description.

For example, the menu bar 3200 may include at least one of a first region 3210, a second region 3220, a third region 3230, and a fourth region 3240. The first region 3210 may be associated with a channel for broadcasting a program related to object information corresponding to the graphic data 3152. The second region 3220 may be associated with the application for allowing the user to view content related to object information corresponding to the graphic data 3152. The third region 3230 may be associated with the application for allowing the user to confirm the image related to object information corresponding to the graphic data 3152. The fourth region 3240 may be associated with the result for searching for object information corresponding to the graphic data 3152 in the web browser application.

If the pointer P corresponding to the movement of the remote controller 1400 is located at the specific icon ($I_S$) from among the icons (I) contained in the menu bar 3200, the controller 1330 may output information 3250 regarding the specific icon ($I_S$) to the display unit 1320. For example, if the specific icon ($I_S$) is associated with the result for searching for object information corresponding to the graphic data 3152 in the web browser application, the information 3250 may include specific information indicating that the specific icon ($I_S$) is the web browser application corresponding to the search result of object information corresponding to the graphic data 3152.

Meanwhile, according to one embodiment of the present invention, assuming that there are a large number of icons (I) contained in the menu bar, if it is impossible to simultaneously display all the icons (I) on the single screen or if the menu bar is composed of a plurality of pages, the icons (I) not displayed on the single screen or the indicator for checking the icons (I) displayed on another page may be contained in the menu bar, and the icons (I) may be scrolled in a horizontal direction because the indicator is selected by the remote controller. In this case, the position of the predetermined icon (I) from among the icons (I) contained in the menu bar may be fixed in the menu bar, irrespective of the scroll of the icons (I), and as such a detailed description thereof will hereinafter be given with reference to FIGS. 33 and 34.

FIG. 33 is a conceptual diagram illustrating one exemplary method for scrolling icons contained in the menu bar of the multimedia device, or outputting another page constructing the menu bar to the display unit according to an embodiment of the present invention. The same contents as those of FIGS. 19 to 32 will herein be omitted for convenience of description, and the example of FIG. 33 will hereinafter be described centering on the difference between FIG. 33 and FIGS. 19 to 32.

Referring to FIG. 33($a$), when the multimedia device logs in with a specific user account or when the predetermined signal for calling the menu bar from the remote controller 1400, the controller 1330 may output the menu bar 3300 to the display unit 1320.

The menu bar 3300 may include icons (I) corresponding to respective channels, respective contents, and respective application. In addition, assuming that there are a large number of icons (I) contained in the menu bar 3300, if it is impossible to simultaneously display all the icons (I) on the single screen or if the menu bar 3300 is composed of a plurality of pages, the icons (I) not displayed on the single screen or the indicators (3301, 3302) for checking the icons (I) displayed on another page may also be contained in the menu bar 3300.

If the indicators (3301, 3302) are selected by the remote controller 1400, the controller 1330 may horizontally scroll the icons (I) contained in the menu bar 330, or may output the icons (I) contained in the other page to the menu bar 3300. In the latter case, the icons (I) shown in FIG. 33($a$) are horizontally scrolled, and at the same time icons (I) contained in the above another page may be displayed. In addition, the icons (I) shown in FIG. 33($a$) may simultaneously disappear from the menu bar 3300 as if a current page is immediately switched to another page, and the icons (I) contained in the above another page may simultaneously appear in the menu bar 3300.

In the meantime, if the predetermined icon (I) from among the icons (I) contained in the menu bar 3300 is present, the controller 1330 may horizontally scroll the remaining icons other than the predetermined icon because the indicators (3301, 3302) are selected by the remote controller 1400. Alternatively, even when the page constructing the menu bar 3300 is immediately switched to another page, the controller 1330 may control the predetermined icon ($I_S$) to continuously hover on the menu bar 3300. That is, if the predetermined icon ($I_S$) from among the icons (I) contained in the menu bar 3300 is contained in the menu bar 3300, although the indicators (3301, 3302) are selected by the remote controller 1400, the position of the predetermined icon ($I_S$) may be fixed in the menu bar 3300. The predetermined icon ($I_S$) may be established or changed by the user, or may be automatically established or changed by the controller 1330. In this embodiment, in order to discriminate between the predetermined icon ($I_S$) and the other icons (I), a reference number ($I_S$) will hereinafter be used for convenience of description.

If the indicator 3301 is selected by the pointer P of the remote controller 1400, the controller 1330 may output the menu bar 3300 including the icons ($I_H$) instead of the icons (I) of FIG. 33(a), to the display unit 1320, as shown in FIG. 33(b). In order to distinguish the icons ($I_H$) contained in the menu bar 3300 from the icons (I) shown in FIG. 33(a), a reference number ($I_H$) will hereinafter be used for convenience of description. Nevertheless, the predetermined icon ($I_S$) may be contained in the menu bar 3300 shown in FIG. 33(b). That is, the remaining icons (I) other than the predetermined icon ($I_S$) from among the icons (I) of FIG. 33(a) are scrolled to the right direction, such that the remaining icons (I) may disappear from the menu bar 3300 shown in FIG. 33(b). For example, the icons ($I_H$) may be associated with history information corresponding to the latest accessed channel, application, and content of the multimedia device. The controller 1330 may store information regarding each of the channel, application, and content accessed through the multimedia device in the memory 1350, and may output the icons ($I_H$) related to at least one of the channel, application, and content accessed through the multimedia device to the menu bar 3300 on the basis of the information stored in the memory 1350. If the signal for selecting any one of the icons ($I_H$) displayed on the menu bar 3300 is received, the execution screen image of the channel, application, or content selected by the received signal may be displayed on the display unit 1320. In this case, the information stored in the memory 1350 may include information regarding a specific time at which execution of the access, application, and content accessed through the multimedia device is stopped, and the execution screen image of the channel, application, or content selected by the received signal may be changed according to the specific time information stored in the memory 1350.

FIG. 34 is a conceptual diagram illustrating another exemplary method for scrolling icons contained in the menu bar of the multimedia device, or outputting another page constructing the menu bar to the display unit according to an embodiment of the present invention. The same contents as those of FIGS. 19 to 33 will herein be omitted for convenience of description, and the example of FIG. 34 will hereinafter be described centering on the difference between FIG. 34 and FIGS. 19 to 33.

Referring to FIG. 34(a), when the multimedia device logs in with a specific user account or when the predetermined signal for calling the menu bar from the remote controller 1400 is received, the menu bar 3400 may be displayed on the display unit 1320.

The menu bar 3400 may include the icons (I) corresponding to respective channels, respective contents, and respective applications. Since there are a large number of icons (I) contained in the menu bar 3400, it is impossible to simultaneously display all icons (I) on the single screen or if the menu bar 3400 includes a plurality of pages, and the indicators (3401, 3402) for confirming the icons (I) not displayed on the single screen and/or the icons (I) displayed on the other page may further be used.

If the indicators (3401, 3402) are selected by the remote controller 1400, the controller 1330 may horizontally scroll the icons (I) contained in the menu bar 3400 or may output the icons (I) contained in another page to the menu bar 3400. In the latter case, the icons (I) shown in FIG. 34(a) are horizontally scrolled, and at the same time the icons (I) contained in the above another page may be displayed. In addition, the icons (I) shown in FIG. 34(a) may simultaneously disappear from the menu bar 3400 as if a current page is immediately switched to another page, and the icons (I) contained in the above another page may simultaneously appear in the menu bar 3400.

In the meantime, if the predetermined icon (I) from among the icons (I) contained in the menu bar 3400 is present, the controller 1330 may horizontally scroll the remaining icons other than the predetermined icon because the indicators (3401, 3402) are selected by the remote controller 1400. Alternatively, even when the page constructing the menu bar 3400 is immediately switched to another page, the controller 1330 may control the predetermined icon ($I_S$) to continuously hover on the menu bar 3400. That is, if the predetermined icon ($I_S$) from among the icons (I) contained in the menu bar 3400 is used, although the indicators (3401, 3402) are selected by the remote controller 1400, the position of the predetermined icon ($I_S$) may be fixed in the menu bar 3400. The predetermined icon ($I_S$) may be established or changed by the user, or may be automatically established or changed by the controller 1330. In this embodiment, in order to discriminate between the predetermined icon ($I_S$) and the other icons (I), a reference number ($I_S$) will hereinafter be used for convenience of description.

If the indicator 3402 is selected by the pointer P of the remote controller 1400, the controller 1330 may output the menu bar 3400 including the icons ($I_H$) instead of the icons (I) of FIG. 34(a), to the display unit 1320, as shown in FIG. 34(b). In order to distinguish the icons ($I_H$) contained in the menu bar 3400 of FIG. 34(b) from the icons (I) shown in FIG. 34(a), a reference number ($I_A$) will hereinafter be used for convenience of description. Nevertheless, the predetermined icon ($I_S$) may be continuously contained in the menu bar 3400 shown in FIG. 34(b). That is, the remaining icons (I) other than the predetermined icon ($I_S$) from among the icons (I) of FIG. 34(a) are scrolled to the left direction, such that the remaining icons (I) may disappear from the menu bar 3400 shown in FIG. 34(b). For example, the icons ($I_A$) may be associated with the list of applications installed in the multimedia device.

In accordance with at least one of the above-mentioned embodiments of the present invention, the present invention can provide a multimedia device for easily logging in using a specific user account and a method for controlling the same.

In addition, according to at least one of the above-mentioned embodiments, the present invention can provide a multimedia device for providing a user environment in which the user can easily access the functions of the multimedia device, and a method for controlling the same.

The above-mentioned embodiments can be implemented as a computer readable code in a recording medium in which a program is recorded. The computer readable medium includes all types of storage devices storing data readable by a computer system. Examples of the computer readable recording medium include Hard Disk Drive (HDD, Solid State Disk (SSD), Silicon Disk Drive (SDD), ROM, RAM, CD-ROM, magnetic tapes, floppy disks, optical data storage devices, etc. and also include implementation in the form of carrier waves (e.g. transmission over the Internet). In addition, the above computer may further include a controller 1330 of a terminal. The above embodiments are therefore to be construed in all aspects as illustrative and not restrictive. The scope of the invention should be determined by the appended claims and their legal equivalents, not by the above description, and all changes coming within the meaning and equivalency range of the appended claims are embraced therein.

As is apparent from the above description, the multimedia device and the method for controlling the same according to the embodiments have the following effects.

In accordance with at least one of the embodiments, the embodiments can provide a multimedia device for easily logging in with a specific user account, and can also provide a method for controlling the multimedia device.

In accordance with at least one embodiment, the embodiments can provide a multimedia device for allowing a user to easily access a multimedia device function, and can also provide a method for controlling the multimedia device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A multimedia device of providing a menu bar providing at least one of an available channel, an available application or an available content which is accessible thereof, the multimedia device comprising:
   a display for displaying video data; and
   a controller for controlling the menu bar to display on the displayed video data in response to a first signal from a remote controller,
   wherein the menu bar includes a first icon and a second icon,
   wherein the first icon is related to at least one of a preferred channel, a channel viewed over a predetermined time, a channel viewed over a predetermined number, a recommended content, a recommended application or a recommended channel,
   wherein the second icon corresponds to a specific user,
   wherein, when the second icon is selected, the controller further controls the display to display a Graphic User Interface (GUI) related to a function among a plurality of functions of the multimedia device based on history data of the specific user using the multimedia device,
   wherein the second icon includes a first sub icon for a first user and a second sub icon for a second user, and the first user and the second user are registered in the multimedia device, and
   wherein the first sub icon is highlighted in the menu bar or a location of the first sub icon on the menu bar is changed in response to logging-in of the first user.

2. The multimedia device of claim 1, wherein, when it is logged-in by an account of the specific user, the second icon is included in the menu bar, or is displayed in the menu bar before the plurality of icons in the menu bar.

3. The multimedia device of claim 1, wherein the controller is configured to monitor at least one of a viewing history of an available channel and an available program on the multimedia device, an execution history of an available application on the multimedia device, or an execution history of an available content on the multimedia device, and wherein the controller is further configured to change a configuration of the menu bar according to time based on a result of the monitoring.

4. The multimedia device of claim 3, wherein the configuration of the menu bar is changed according to at least one of a type of one or more icons to be displayed in the menu bar or an order of the one or more icons arranged on the menu bar.

5. The multimedia device of claim 4, wherein, when one or more predetermined icons included in the menu bar are present, the controller further controls the predetermined locations of the one or more icons to be fixed in the menu bar regardless of the result of the monitoring.

6. The multimedia device of claim 1, further comprising a first receiver for receiving metadata of a program, wherein the controller further controls the display to display information of current viewing program of a channel based on the received metadata of the program related to a specific channel, when a pointer corresponding to a movement of the remote controller is located on an icon which corresponds to the specific channel.

7. The multimedia device of claim 6, wherein, when the icon corresponding to the specific channel by the remote controller, the controller further controls the first receiver to switch a current channel to the specific channel in order to receive a broadcasting signal from the switched specific channel, and the display to output video data included in the received broadcasting signal.

8. The multimedia device of claim 1, further comprising a second receiver, wherein the controller further controls the display to display information on a specific content based on the metadata, related to the specific content, received from the second receiver, when a pointer corresponding to a movement of the remote controller is located on an icon which corresponds to the specific content.

9. The multimedia device of claim 8, wherein, when the icon corresponds to a specific channel by the remote controller, the controller further controls the display to display a window including detailed information of the specific content based on the metadata, related to the specific content, received from the second receiver.

10. The multimedia device of claim 1, wherein the menu bar includes indicators for scrolling left or right, and wherein the controller further controls the menu bar to scroll left or right in response to a movement of a pointer, the scrolled menu bar displaying one or more icons which are not the predetermined icons.

11. The multimedia device of claim 1, wherein the controller further controls a memory to store information of an accessed channel, information of an executed application and information of an executed content, wherein, when receiving a second signal from the remote controller, the controller is configured to control the display to display one or more history icons related to at least one of the stored information of an accessed channel, information of an executed application or information of an executed content, and wherein, when receiving a third signal selecting a history icon among the displayed one or more history icons, the controller further controls the display to display an execution screen of any one of a channel, an application or a content related to the selected history icon.

12. The multimedia device of claim 11, wherein the stored information includes time information on stopping the reproduction of the channel, the application and the content, and wherein the displayed execution screen is referred to the time information.

13. The multimedia device of claim 1, wherein the controller is further configured to:
identify an object included in the video data displayed via the display,
detect object information on the identified object, and
configure the menu bar based on at least one of a channel, an application or a content, which is related to the detected object information, among available channels, available applications and an available content on the multimedia device.

14. The multimedia device of claim 1, further comprising a third receiver receiving metadata on a specific content which corresponds to the displayed video data, wherein the controller is configured to configure the menu bar based on at least one of a channel, an application or a content, which is related to the received metadata on the specific content, among available channels, available applications and an available content on the multimedia device.

15. The multimedia device of claim 1, wherein the controller is configured to:
detect a command activating a specific function for identifying an object included in the video data displayed via the display,
identify the object in response to the detected command,
detect object information on the identified object,
control the detected object information to display on the video data, and
configure the menu bar based on at least one of a channel, an application or a content, which are related to the detected object information, among available channels, available applications and an available content on the multimedia device.

16. The multimedia device of claim 15, wherein, when any one of the displayed object information is selected, the controller is configured to configure the menu bar based on at least one of a channel, an application or a content, which is related to the selected object information, among available channels, available applications and an available content on the multimedia device.

17. A method of controlling a multimedia device to provide a menu bar which is capable of accessing at least one of an available channel, an available application or an available content, the method comprising:
logging-in the multimedia based on an account of a specific user;
displaying the menu bar corresponding to the account of the logged-in user, wherein the menu bar includes a first icon and a second icon corresponding to the specific user;
monitoring at least one of history data of an available channel and an available program on the multimedia device, an execution history of an available application on the multimedia device, or an execution history of an available content on the multimedia device after logged-in; and
changing a configuration of the displayed menu bar based on a result of the monitoring,
wherein the second icon includes a first sub icon for a first user and a second sub icon for a second user, and the first user and the second user are registered in the multimedia device, and
wherein the first sub icon is highlighted in the menu bar or a location of the first sub icon on the menu bar is changed in response to logging-in of the first user.

18. The method of claim 17, wherein the menu bar includes icons corresponding to a channel, content and an application, wherein the method further comprises displaying detailed information of a specific channel, a specific content or a specific application, when a pointer corresponding to a movement of the remote controller is located on an icon which corresponds to the specific channel, the specific content, or the specific application.

19. The method of claim 17, further comprising:
receiving a specific content;
displaying a screen corresponding to the received specific content;
identifying an object included in the displayed screen;
detecting object information of the identified object; and
changing a configuration of the menu bar based on at least one of a viewing history of an available channel and an available program on the multimedia device, an execution history of an available application on the multimedia device, or an execution history of an available content on the multimedia device.

* * * * *